United States Patent
Schumacher et al.

(10) Patent No.: US 12,298,887 B2
(45) Date of Patent: May 13, 2025

(54) DATA PROCESSING ARRAY EVENT TRACE CUSTOMIZATION, OFFLOAD, AND ANALYSIS

(71) Applicant: Xilinx, Inc., San Jose, CA (US)

(72) Inventors: Paul Robert Schumacher, Berthoud, CO (US); Anurag Dubey, Boulder, CO (US); Roger Ng, Campbell, CA (US); Ishita Ghosh, San Jose, CA (US); Scott H. Jonas, Niwot, CO (US); Krishnan Subramanian, San Jose, CA (US); Jason Richard Villarreal, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 18/305,244

(22) Filed: Apr. 21, 2023

(65) Prior Publication Data
US 2024/0354223 A1    Oct. 24, 2024

(51) Int. Cl.
G06F 11/36    (2006.01)
G06F 11/34    (2006.01)
G06F 11/362   (2025.01)

(52) U.S. Cl.
CPC ........ *G06F 11/3636* (2013.01); *G06F 11/348* (2013.01)

(58) Field of Classification Search
CPC ............................. G06F 11/3636; G06F 11/348
See application file for complete search history.

(56) References Cited

U.S. PATENT DOCUMENTS

| | | |
|---|---|---|
| 7,490,227 B1 | 2/2009 | Bilski et al. |
| 8,042,007 B1 | 10/2011 | Chan et al. |
| 8,117,577 B1 | 2/2012 | Vadi et al. |
| 8,415,974 B1 | 4/2013 | Lysaght |
| 9,678,852 B2 * | 6/2017 | Horley ................. G06F 11/3466 |
| 10,346,572 B1 | 7/2019 | Corbett et al. |
| 10,474,610 B1 * | 11/2019 | Schelle ............... G06F 11/3636 |
| 2008/0244327 A1 * | 10/2008 | Coombes .............. G06F 11/348 |
| | | 714/45 |
| 2008/0320268 A1 | 12/2008 | Wingard |
| 2010/0095152 A1 | 4/2010 | Darrington |
| 2018/0150299 A1 | 5/2018 | Balle |
| 2019/0102224 A1 | 4/2019 | Bernat |
| 2019/0303311 A1 | 10/2019 | Bilski et al. |
| 2019/0317802 A1 | 10/2019 | Bachmutsky |
| 2022/0027278 A1 | 1/2022 | Wysocki |
| 2024/0378062 A1 | 11/2024 | Mysore et al. |
| 2024/0378358 A1 | 11/2024 | Schumacher et al. |

* cited by examiner

*Primary Examiner* — Nadeem Iqbal
(74) *Attorney, Agent, or Firm* — Kevin T. Cuenot

(57) ABSTRACT

Event trace includes implementing a design for a data processing array of a target integrated circuit (IC) by, at least in part, adding a trace data offload architecture to the design. One or more selected tiles of the data processing array used by the design as implemented in the target IC are configured to generate trace data based on user-specified runtime settings for performing a trace. During execution of the design by the data processing array, trace data as generated by the one or more selected tiles of the data processing array is conveyed to a memory of the target IC using the trace data offload architecture. A trace report is generated from the trace data using a data processing system coupled to the target IC.

20 Claims, 19 Drawing Sheets

700

Implement a design for a data processing array of a target integrated circuit by, at least in part, including a trace data offload architecture
702

Configure one or more selected tiles of the data processing array used by the design as implemented in the target integrated circuit to generate trace data based on user-specified runtime settings for performing trace
704

During execution of the design by the data processing array, convey the trace data as generated by the one or more selected tiles of the data processing array to a memory of the target integrated circuit using the selected trace data offload architecture
706

Generate a trace report from the trace data using a data processing system coupled to the target integrated circuit.
708

Receive user-specified compilation options for performing trace
802

Compile design by placing and routing kernels and generating executable program code
804

Implement the trace data offload architecture
806

Implement data path(s) within PL of the target IC and connect the data path(s) to DP array and other circuit(s) external to DP array
808

Implement data path(s) from DMA circuits of interface tiles to other circuit(s) external to DP array
810

Generate metadata from the compiling that specifies correlations between different portions of the design and different tiles of the data processing array used by the design
812

Generate package files for the design
814

DATA PROCESSING ARRAY EVENT TRACE CUSTOMIZATION, OFFLOAD, AND ANALYSIS

TECHNICAL FIELD

This disclosure relates to integrated circuits (ICs) and, more particularly, to systems and methods for performing trace, trace data offload, and analysis for a data processing array within an IC.

BACKGROUND

Modern integrated circuits (ICs) include a variety of different types of compute circuits. Examples of compute circuits that may be included in a single IC include, but are not limited to, one or more processors configured to execute program code, one or more dedicated and hardened circuit blocks configured to perform particular tasks, one or more user-specified circuits implemented in programmable circuitry (e.g., programmable logic), a data processing array, a graphics processing unit (GPU), or the like. In developing a design for an IC, it is often necessary to collect trace data from the compute circuits to ensure that the design is operating as intended and/or to debug the design.

There are a variety of different challenges for performing trace particularly with certain types of compute circuits. These challenges relate to the quantity of trace data generated as well as the complexity of the trace data. For example, a data processing array is capable of generating a significant amount of trace data and may do so in a brief period of time. Significant bandwidth and robust storage are needed on-chip to handle the trace data. For the trace functionality to be useful, meaningful interpretation and analysis of the trace data is also needed given the complexity and numerous components that form the data processing array.

SUMMARY

In one or more example implementations, a method includes implementing a design for a data processing array of a target integrated circuit by, at least in part, adding a trace data offload architecture to the design. The method includes configuring one or more selected tiles of the data processing array used by the design as implemented in the target integrated circuit to generate trace data based on user-specified runtime settings for performing a trace. The method includes, during execution of the design by the data processing array, conveying the trace data as generated by the one or more selected tiles of the data processing array to a memory of the target integrated circuit using the trace data offload architecture. The method includes generating a trace report from the trace data using a data processing system coupled to the target integrated circuit.

The foregoing and other implementations can each optionally include one or more of the following features, alone or in combination. Some example implementations include all the following features in combination.

In some aspects, the method includes generating metadata from compiling the design. The metadata specifies correlations between different portions of the design and different tiles of the data processing array used by the design. The method includes providing the metadata to a runtime executing on a processor system of the target integrated circuit. The runtime performs the configuring of the one or more selected tiles of the data processing system.

In some aspects, the method includes generating metadata from the compiling. The metadata specifies correlations between different portions of the design and different tiles of the data processing array used by the design. The method includes generating configuration data used to configure the one or more selected tiles of the data processing array based on the metadata. The method includes providing the configuration data to the data processing array.

In some aspects, the trace data offload architecture is selected from a plurality of trace data offload architectures. The plurality of trace data offload architectures can include a first architecture that conveys one or more streams of the trace data from the data processing array through one or more data paths implemented in programmable logic. The plurality of trace data offload architectures can include a second architecture that conveys the one or more streams of the trace data from the data processing array through one or more direct memory access circuits.

In some aspects, implementing the design includes routing a specified number of streams for conveying the trace data to the trace data offload architecture. Each tile of the data processing array used by the design is coupled to at least one of the streams as routed.

In some aspects, the method includes coupling the streams conveying trace data to one or more data movers of the trace data offload architecture.

In some aspects, the method includes allocating buffers in the memory of the target integrated circuit for the streams.

In some aspects, each buffer as allocated has a user-specified depth.

In some aspects, generating the trace report includes analyzing the trace data using the user-specified runtime settings and metadata generated from compiling the design. The trace report correlates trace events of the trace data with respective tiles of the one or more selected tiles of the data processing array.

In some aspects, the trace report correlates the trace events with particular functions executed by the one or more selected tiles of the data processing array as specified by the metadata.

In some aspects, the trace report correlates the trace events with a particular operation performed by a function executed by the one or more selected tiles of the data processing array as specified by the metadata.

In some aspects, the user-specified runtime settings specify the trace events generated during the trace.

In one or more example implementations, a system includes an integrated circuit having a data processing array. The data processing array includes an array of tiles. The system includes a user-specified trace data offload architecture coupled to the data processing array. The system includes a memory. A plurality of active tiles of the array of tiles are used to execute a user design implemented in the data processing array. One or more selected tiles of the plurality of active tiles are configured to generate trace data during execution of the design by the data processing array. The user-specified trace data offload architecture is configured to convey a plurality of streams of the trace data as generated by the one or more selected tiles to the memory.

The foregoing and other implementations can each optionally include one or more of the following features, alone or in combination. Some example implementations include all the following features in combination.

In some aspects, the user-specified trace data offload architecture includes one or more data paths implemented in programmable logic for the plurality of streams of the trace data.

In some aspects, the user-specified trace data offload architecture includes one or more direct memory access circuits configured to convey the plurality of streams of the trace data.

In some aspects, the system includes a data processing system configured to generate a trace report from the trace data.

In some aspects, the data processing system is configured to generate the trace report by analyzing the trace data using user-specified runtime settings and metadata generated from compiling the user design to correlate trace events of the plurality of streams of the trace data with respective tiles of the one or more selected tiles.

In some aspects, the data processing system is configured to generate the trace report by correlating the trace events with particular functions executed by the selected tiles as specified by the metadata.

In some aspects, the data processing system is configured to generate the trace report by correlating the trace events with particular operations performed by particular functions executed by the selected tiles as specified by the metadata.

In some aspects, the system includes a network-on-chip. The user-specified trace data offload architecture conveys the plurality of the streams of the trace data from the data processing array to the network-on-chip. The system includes a memory controller coupled to the network-on-chip. The memory controller is configured to write the trace data received via the network-on-chip to the memory.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 7 illustrates another example method of performing hardware trace, trace data offload, and trace data analysis for a design implemented in a DP array.

FIG. 8 illustrates an example implementation of block 702 of FIG. 7.

DETAILED DESCRIPTION

Figure 1:
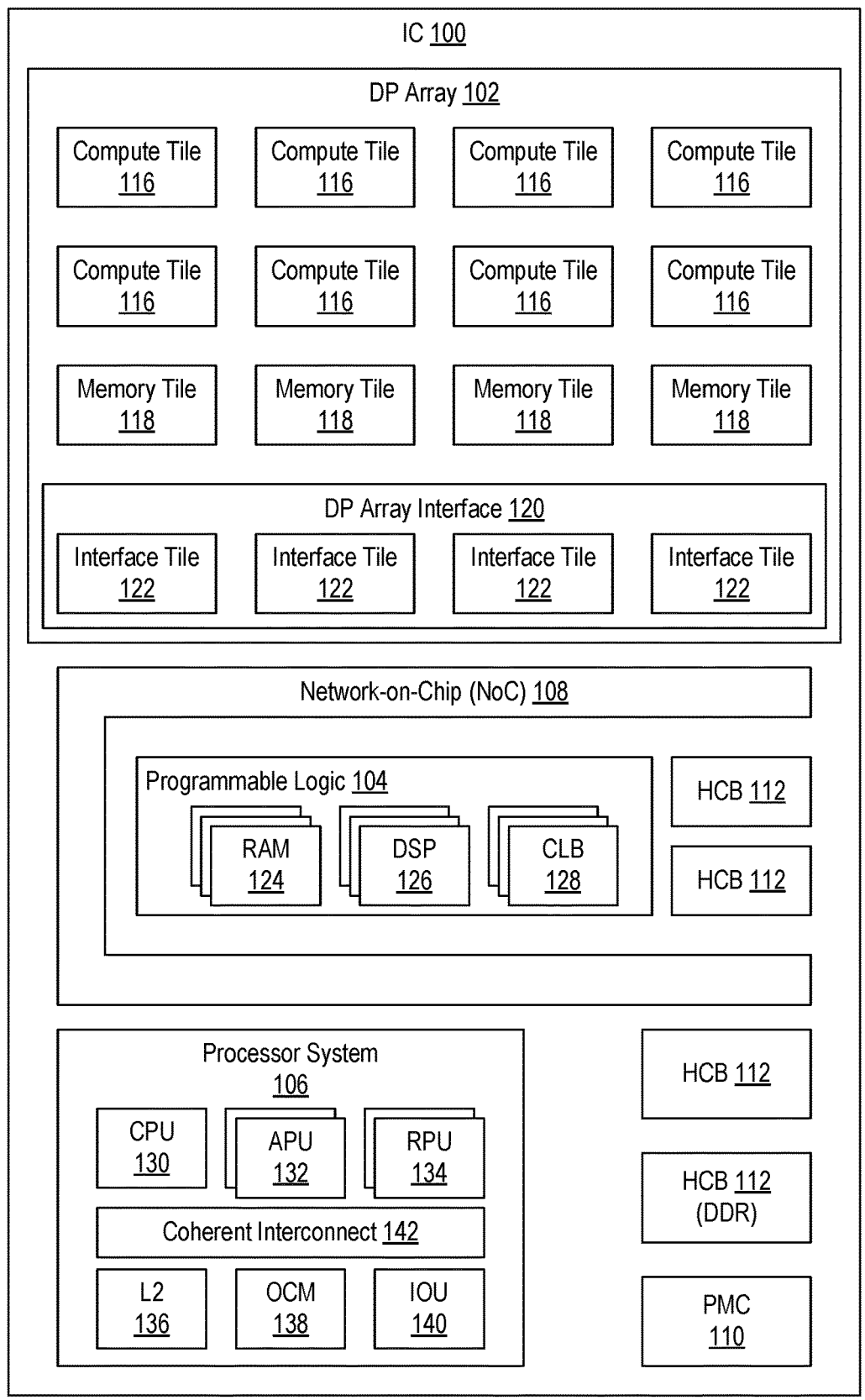
FIG. 1 illustrates an example architecture for an integrated circuit (IC).

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to systems and methods for performing trace, trace data offload, and analysis for a data processing array within an IC. In accordance with the inventive arrangements described within this disclosure, a design for a data processing array may be compiled for implementation in a target IC. As part of the compilation process, a trace data offload architecture may be incorporated into the design. The trace data offload architecture facilitates the offloading and storage of trace data generated by the data processing array.

At or before runtime of the design as implemented in the target IC, particular tiles of the data processing array that are utilized by the design may be configured to generate trace data. The configuration may be performed based on user-specified runtime settings that define how and/or when trace is to be performed as the design executes in the data processing array. The configuration also may be performed using metadata generated during compilation of the design. The particular trace data, e.g., trace events, generated during execution of the design in the IC may be user-specified and, as such, customized. The trace data is conveyed over the trace data offload architecture to a memory.

The trace data may be moved or transferred from the memory to a data processing system for analysis. The data processing system is capable of generating a trace report from the trace data. The trace report may be generated based on, or using, the metadata generated during compilation of the design and/or the user-specified runtime settings. Use of the metadata and/or the user-specified runtime settings allows the data processing system to generate a trace report that provides meaningful information that correlates the trace events in time and to particular ones of the tiles of the data processing array.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example architecture 100 for an IC. Architecture 100 may be used to implement a programmable IC, an adaptive system, and/or a System-on-Chip (SoC). In the example of FIG. 1, architecture 100 is implemented on a single die provided within a single package. In other examples, architecture 100 may be implemented using a plurality of interconnected dies within a single package where the various resources of architecture 100 (e.g., circuits) illustrated in FIG. 1 are implemented across the different interconnected dies.

In the example, architecture 100 includes a plurality of different subsystems including a data processing array (DP array) 102, programmable logic (PL) 104, a processor system (PS) 106, a Network-on-Chip (NoC) 108, a platform management controller (PMC) 110, and one or more hardwired circuit blocks (HCBs) 112.

DP array 102 is implemented as a plurality of interconnected and programmable tiles. The term "tile," as used herein, means a block or portion of circuitry also referred to as a "circuit block." As illustrated, DP array 102 includes a plurality of compute tiles 116 organized in an array and optionally a plurality of memory tiles 118. DP array 102 also includes a DP array interface 120 having a plurality of interface tiles 122.

In the example, compute tiles 116, memory tiles 118, and interface tiles 122 are arranged in an array (e.g., a grid) and are hardwired. Each compute tile 116 can include one or more cores (e.g., a processor) and a memory (e.g., a random-access memory (RAM)). Each memory tile 118 may include a memory (e.g., a RAM). In one example implementation, cores of compute tiles 116 may be implemented as custom circuits that do not execute program code. In another example implementation, cores of compute tiles 116 are capable of executing program code stored in core-specific program memories contained within each respective core.

Figure 2A:
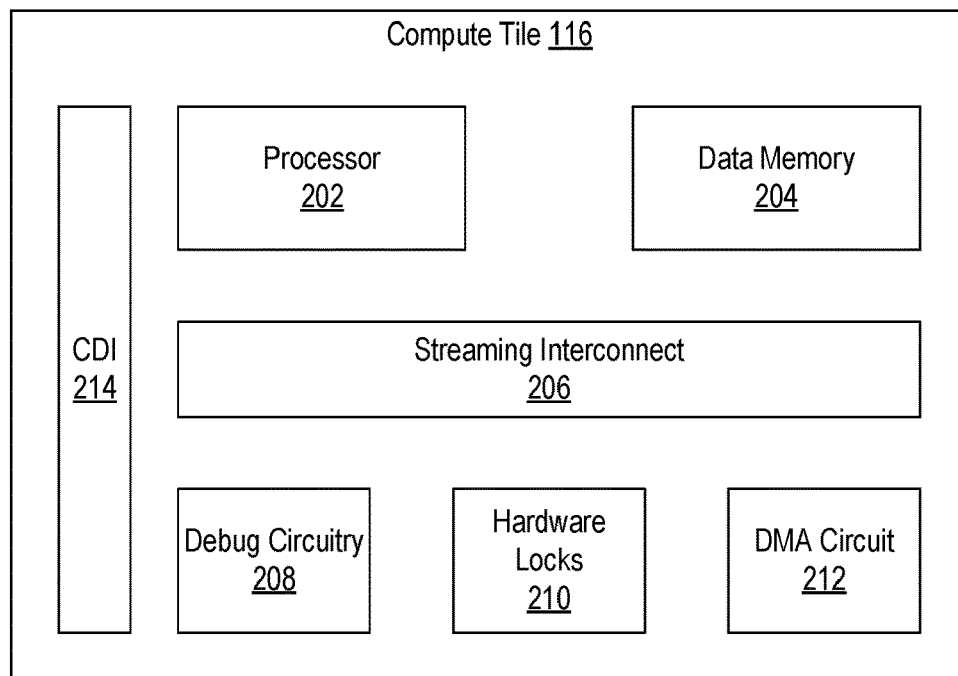
FIGS. 2A, 2B, and 2C illustrate example implementations of tiles of a data processing (DP) array.

FIG. 2A illustrates an example implementation of a compute tile 116. In the example, compute tile 116 includes a processor 202, a data memory 204, a streaming interconnect 206, debug circuitry 208, hardware locks 210, a direct memory access (DMA) circuit 212, and a configuration and debug interface (CDI) 214. Within this disclosure, DMA circuits are examples of data movers. Processor 202 may be implemented with a Very-Long Instruction word) architecture. In one or more examples, processor 202 may be implemented as a vector processor capable of performing both fixed and floating-point operations and/or a scalar processor. Data memory 204 may be implemented as a RAM. Processor 202 is capable of directly accessing the data memory 204 in the same compute tile and in other adjacent compute tiles 116. Processor 202 also has direct connections to other processors 202 in adjacent compute tiles 116 so that data may be conveyed directly between processors 202 without writing such data to a data memory 204 (e.g., without using shared memory to communicate data and/or without conveying data over a streaming interconnect 206).

Streaming interconnect 206 provides dedicated multi-bit data movement channels connecting to streaming interconnects 206 in each adjacent tile in the north, east, west, and south directions of DP array 102. DMA circuit 212 is coupled to streaming interconnect 206 and is capable of performing DMA operations to move data into and out from data memory 204 by way of streaming interconnect 206. Hardware locks 210 facilitate the safe transfer of data to/from data memory 204 and other adjacent and/or non-adjacent tiles. CDI 214 may be implemented as a memory mapped interface providing read and write access to any memory location within compute tile 116. Compute tile 116 may include other circuit blocks not illustrated in the general example of FIG. 2A.

Figure 2B:
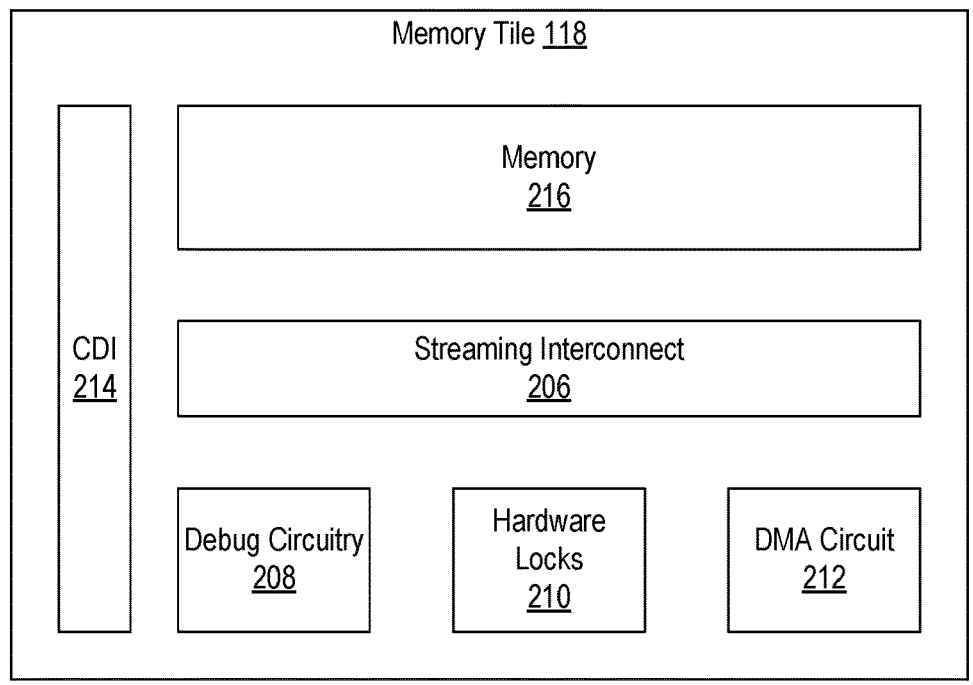

FIG. 2B illustrates an example implementation of a memory tile 118. In the example, memory tiles 118 include a memory 216, a streaming interconnect 206, debug circuitry 208, hardware locks 210, a DMA circuit 212, and a CDI 214. Memory 216 may have a larger capacity than data memory 204. DMA circuit 212 of each memory tile 118 may access the memory 216 within the same tile as well as the memory 216 of one or more adjacent memory tiles. In general, memory tile 118 is characterized by the lack of a processor and the inability to execute program code. Each memory tile 118 may be read and/or written by any of compute tiles 116 and/or interface tiles 122 by way of interconnected streaming interconnects 206. Memory tile 118 may include other circuit blocks not illustrated in the general example of FIG. 2B.

DP array interface 120 connects compute tiles 116 and/or memory tiles 118 to other resources of architecture 100. As illustrated, DP array interface 120 includes a plurality of interconnected interface tiles 122 organized in a row. In one example, each interface tile 122 may have a same architecture. In another example, interface tiles 122 may be implemented with different architectures where each different interface tile architecture supports communication with a different type of resource (e.g., subsystem) of architecture 100. Interface tiles 122 of DP array interface 120 are connected so that data may be propagated from one interface tile to another bi-directionally. Each interface tile is capable of operating as an interface for the column of compute tiles 116 and/or memory tiles 118 directly above.

Figure 2C:
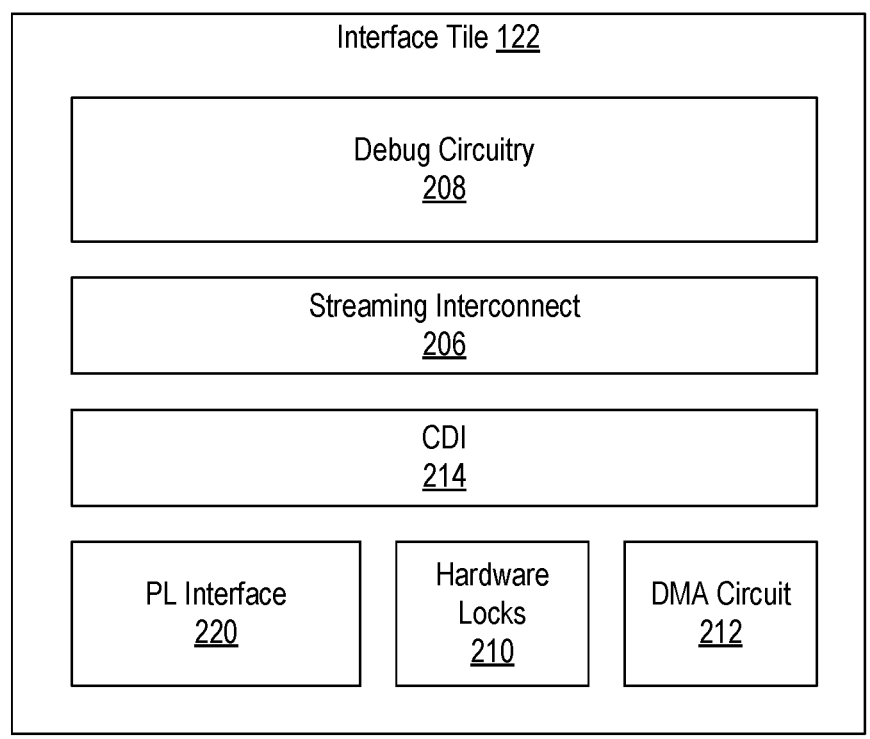

FIG. 2C illustrates an example implementation of an interface tile 122. In the example, interface tile 122 includes a PL interface 220, a streaming interconnect 206, debug circuitry 208, hardware locks 210, a DMA circuit 212, and a CDI 214. Interface tile 122 may include other circuit blocks not illustrated in the general example of FIG. 2C. The example interface tile 122 of FIG. 2C is capable of communicating with the PL 104 via PL interface 220 and NoC 108 via DMA circuit 212. Other example architectures for interface tile 122 may omit interface 220 or omit DMA circuit 212.

PL 104 is circuitry that may be programmed to perform specified functions. As an example, PL 104 may be implemented as field programmable gate array type of circuitry. Programmable logic 104 can include an array of programmable circuit blocks. The programmable circuit blocks may include, but are not limited to, RAMs 124 (e.g., block RAMs of varying size), digital signal processing (DSP) blocks 126 capable of performing various multiplication operations, and/or configurable logic blocks (CLBs) 128 each including one or more flip-flops and a lookup table. As defined herein, the term "programmable logic" means circuitry used to build reconfigurable digital circuits. The topology of PL 104 is highly configurable unlike hardwired circuitry. Connectivity among the circuit blocks of PL 104 may be specified on a per-bit basis while the tiles of DP array 102 are connected by multi-bit data paths (e.g., streams) capable of packet-based communication.

PS 106 is implemented as hardwired circuitry that is fabricated as part of architecture 100. PS 106 may be implemented as, or include, any of a variety of different processor types each capable of executing program code. For example, PS 106 may include a central processing unit (CPU) 130, one or more application processing units (APUs) 132, one or more real-time processing units (134), a level 2 (L2) cache 136, an on-chip memory (OCM) 138, an Input/Output Unit (IOU) 140, each interconnected by a coherent interconnect 142. The example CPU and/or processing units of PS 106 may be implemented using any of a variety of different types of architectures. Example architectures that may be used to implement processing units of PS 106 may include, but are not limited to, an ARM processor architecture, an x86 processor architecture, a graphics processing unit (GPU) architecture, a mobile processor architecture, a DSP architecture, combinations of the foregoing architectures, or other suitable architecture that is capable of executing computer-readable instructions or program code.

NoC 108 is a programmable interconnecting network for sharing data between endpoint circuits in architecture 100. NoC 108 may be implemented as a packet-switched network. The endpoint circuits can be disposed in DP array 102, PL 104, PS 106, and/or selected HCBs 112. NoC 108 can include high-speed data paths with dedicated switching. In an example, NoC 108 includes one or more horizontal paths, one or more vertical paths, or both horizontal and vertical path(s). NoC 108 is an example of the common infrastructure that is available within architecture 100 to connect selected components and/or subsystems.

Being programmable, nets that are to be routed through NoC 108 may be unknown until a design is created for implementation within architecture 100. NoC 108 may be programmed by loading configuration data into internal configuration registers that define how elements within NoC 108 such as switches and interfaces are configured and operate to pass data from switch to switch and among the NoC interfaces to connect the endpoint circuits. NoC 108 is fabricated as part of architecture 100 (e.g., is hardwired) and, while not physically modifiable, may be programmed to establish logical connectivity between different master circuits and different slave circuits of a user circuit design.

PMC 110 is a subsystem within architecture 100 that is capable of managing the other programmable circuit resources (e.g., subsystems) across the entirety of architecture 100. PMC 110 is capable of maintaining a safe and secure environment, booting architecture 100, and managing architecture 100 during normal operations. For example, PMC 110 is capable of providing unified and programmable control over power-up, boot/configuration, security, power management, safety monitoring, debugging, and/or error handling for the different subsystems of architecture 100 (e.g., DP array 102, PL 104, PS 106, NoC 108, and/or HCBs 112). PMC 110 operates as a dedicated platform manager that decouples PS 106 and from PL 104. As such, PS 106 and PL 104 may be managed, configured, and/or powered on and/or off independently of one another.

HCBs 112 are special-purpose or application specific circuit blocks fabricated as part of architecture 100. Though hardwired, HCBs 112 may be configured by loading configuration data into control registers to implement one or more different modes of operation. Examples of HCBs 112 may include input/output (I/O) blocks (e.g., single-ended and pseudo differential I/Os), transceivers for sending and receiving signals to circuits and/or systems external to architecture 100 (e.g., high-speed differentially clocked transceivers), memory controllers, cryptographic engines, digital-to-analog converters (DACs), analog-to-digital converters (ADCs), and the like. In another aspect, one or more HCBs 112 may implement a RAM such as a Double Data Rate (DDR) memory.

The various programmable circuit resources illustrated in FIG. 1 may be programmed initially as part of a boot process. During runtime, the programmable circuit resources may be reconfigured. In one aspect, PMC 110 is capable of initially configuring DP array 102, PL 104, PS 106, and NoC 108. At any point during runtime, PMC 110 may reconfigure all or a portion of architecture 100. In some cases, PS 106 may configure and/or reconfigure PL 104 and/or NoC 108 once initially configured by PMC 110.

Architecture 100 is provided as an example. Other example architectures for an IC may omit certain subsystems described herein and/or include additional subsystems not described herein. Further, the particular subsystems described herein may be implemented differently to have fewer or more components than shown. Particular components common across different tiles of DP array 102 and having same reference numbers such as streaming interconnects 206, CDIs 214, DMA circuits 212, and the like have substantially the same functionality from one tile to another. It should be appreciated, however, that the particular implementation of such circuit blocks may differ from one type of tile to another. As an illustrative and non-limiting example, the number of ports of the streaming interconnect 206 may be different for a compute tile 116 compared to a memory tile 118 and/or an interface tile 122. Similarly, the number of channels of a DMA circuit 212 may be different in a compute tile 116 compared to a memory tile 118 and/or an interface tile 122. Appreciably, in other examples, the circuit blocks may be implemented the same across different tiles.

Figure 3A:
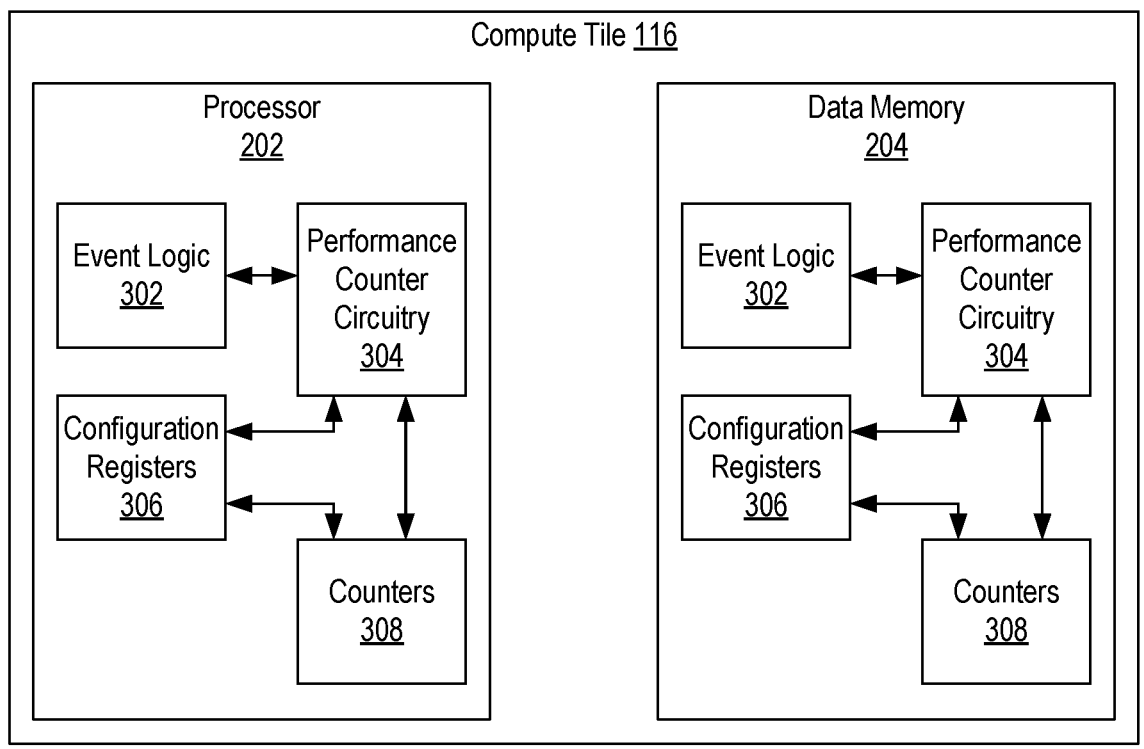
FIGS. 3A and 3B, taken collectively, illustrate example debug circuitry included in tiles of the DP array.
Figure 3B:
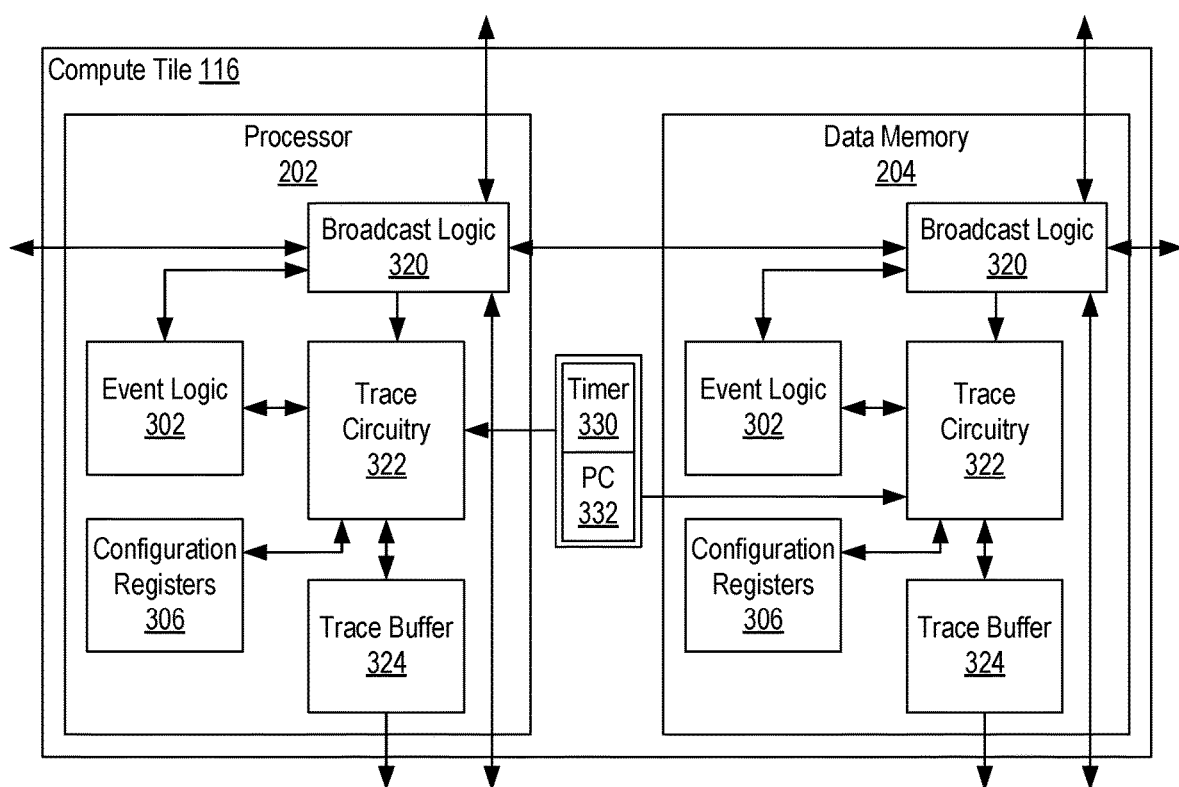

FIGS. 3A and 3B, taken collectively, illustrate various aspects of the debug circuitry 208 included in the various tiles of DP array 102. Referring to FIG. 3A, the debug circuitry 208 of compute tile 116 may include a set of circuit blocks that are configurable to implement trace functionality. The circuit blocks include event logic 302, performance counter circuitry 304, configuration registers 306, and counters 308. As illustrated, the circuit blocks are implemented in both processor 202 and in data memory 204.

Event logic 302 is capable of detecting a plurality of different types of trace events within processor 202. Examples of trace events that may be detected by event logic 302 may include, but are not limited to, function calls, function returns, data transfers, stalls, etc. The particular types of trace events that are to be detected may be specified by configuration registers 306. For example, configuration registers 306 may have space for specifying up to 8 different types of trace events to be detected out of a possible 128 different trace events. The occurrence of particular trace events during the time in which trace is conducted may be counted by respective ones of counter 308, which may be controlled and/or managed by performance counter circuitry 304 based on other settings stored in configuration registers 306.

Debug circuitry 208 may be started and/or stopped in response to the occurrence of particular events as defined by data stored in configuration registers 306. For example, the monitoring and detection of trace events may be initiated in response to the detection of a particular event considered a start event and stopped in response to the detection of a particular event considered a stop event.

Configuration registers 306 may be programmed with user-specified runtime settings that define the start and stop conditions and the particular trace events that event logic 302 is to monitor for. In one or more examples, configuration registers 306 may be programmed after a design is loaded into DP array 102 for execution. In one or more other examples, configuration registers 306 may be programmed, at least initially, with configuration data included in the particular design that is compiled and loaded into the DP array 102 for execution.

Referring to FIG. 3B, the debug circuitry 208 of compute tile 116 may include a set of circuit blocks that are configurable to implement further trace functionality. The circuit blocks include event logic 302, broadcast logic 320, trace circuitry 322, configuration registers 306, and trace buffer 324. As illustrated, the circuit blocks are implemented in processor 202 and in data memory 204. Further, the trace circuitry 322 in processor 202 and data memory 204 is coupled to a timer 330 and a program counter 332 so that each trace event may be associated or stored with a timer value and/or a program counter value.

In the example, events generated by event logic 302 may be provided to broadcast logic 320 and conveyed to one or more different broadcast logic 320 circuits in the same tile and/or in different tiles of DP array 102. This allows trace events to be conveyed to the broadcast logic 320 in data memory 204 in the same tile or to broadcast logic 320 of a different tile where the events may be stored in a different trace buffer 324. Trace events may be conveyed from broadcast logic 320 to trace circuitry 322, where the events may be associated with the timer value and/or program counter and then stored in trace buffer 324. A stream of trace data may be output from trace buffer 324 for output from DP array 102.

While the examples of FIGS. 3A and 3B focus on compute tiles 116, it should be appreciated that the circuitry illustrated in FIG. 3A and/or 3B also may be implemented in memory tiles 118 and/or interface tiles 122 as debug circuitry 208. In the case of memory tiles 118 and interface tiles 122, the circuitry may or may not be replicated as illustrated in the examples of FIG. 3.

Figure 4:
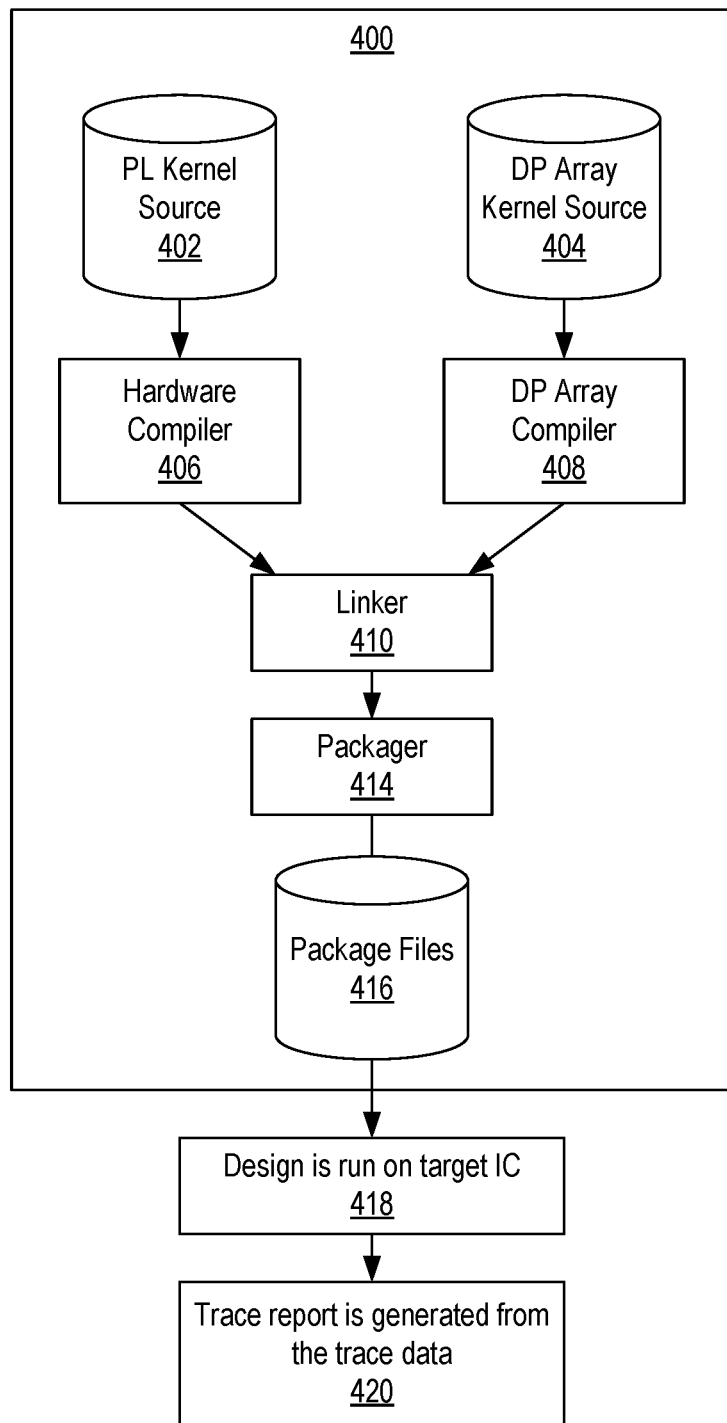
FIG. 4 illustrates an example method of performing hardware trace, trace data offload, and trace data analysis.

FIG. 4 illustrates an example method of performing hardware trace and analysis. The method of FIG. 4 includes a design flow 400 for implementing a design in an IC having an architecture as described in connection with FIG. 1. Design flow 400 may be performed by a data processing system. An example of a data processing system is described in connection with FIG. 6.

As shown, source code specifying one or more programmable logic kernels (e.g., PL kernel source 402) is provided to a hardware compiler 406. Hardware compiler 406 may generate placed and routed versions of the user specified PL kernels of PL kernel source 402. Source code specifying one or more data processing array kernels (e.g., DP array kernel source 404) is provided to DP array compiler 408. DP array compiler 408 may generate executable and placed versions of DP array kernels of DP array kernel source 404. The compiled PL kernel source 402 and the compiled DP array kernel source 404 are provided to linker 410.

Linker 410 receives the compiled PL kernel source 402 and the compiled DP array kernel source 404 and operates on both based on user specified compilation options. The compilation options may be specified via any of a variety of user input mechanisms. In one aspect, the compilation parameters may be specified as command line options. The compilation options may specify a particular trace data offload architecture that is to be implemented in the target IC to connect DP array 102 with one or more other circuits for offloading trace data.

Linker 410 is capable of including a particular trace data offload architecture specified by the user as a compilation option. Linker 410, for example, adds the specified trace data offload architecture and connects the specified trace data offload architecture to the DP array 102 and to another circuit external to DP array 102 such as NoC 108. Trace data may be output from DP array 102 as one or more different streams of trace data. The trace data offload architecture may be one of two different possible types. One type of trace data offload architecture is implemented as one or more data paths implemented or created in PL 104. In general, a data path may be created in PL 104 for each different stream of trace data that is output from DP array 102. Each data path may have a data mover (circuit) to be described herein in greater detail. Another type of trace data offload architecture is implemented using the DMA circuit 212 of one or more interface tiles 122. As noted, a DMA circuit 212 is a type of data mover circuit.

An example of a user provided command that may be entered into a command line to specify compilation options is illustrated in Listing 1.

Listing 1
aiecompiler <options> --event-trace=runtime --num-trace-streams=16 -trace-plio-width=64 --event-trace-port=plio In the example of Listing 1, the compilation parameters include the number of streams of trace data to be output from DP array 102 to be 16. Further, compilation parameters specify the PLIO (Programmable Logic I/O) trace data offload option indicating that the trace data offload architecture is to be implemented in PL 104. Given the configurability of PL 104, the width of each stream of trace data and the corresponding data path through PL 104 also may be specified. The example of Listing 1 illustrates that the user may specify the number of streams of trace data that will be output from DP array 102. In a DMA-based implementation of the trace data offload architecture (e.g., specified using a Global Memory I/O or "GMIO" compilation option), the width of the streams is fixed. As part of placing and routing the DP array kernels of DP array kernel source 404, DP array compiler 408 further generates a routing for the trace data based on the number of streams specified by the user.

From the linked components generated by linker 410, packager 414 is capable of generating one or more output files as package files 416. Package files 416 may include binary files/images that may be loaded into the target IC to implement the user design (e.g., PL kernel source 402 and DP array kernel source 404) within the target IC along with the trace data offload architecture. Packager 414, for example, is capable of generating the files required for the target IC to boot and run the user design for performing trace.

In one or more example implementations, linker 410 is capable of generating a metadata section that may be included in package files 416. The metadata section may specify information such as DP array kernel to tile mapping, instance names for functions of kernels, addresses, versions, and/or other properties of DP array kernels as compiled and mapped to tiles of DP array 102. While configuration data for loading into configuration registers 306 may be included in package files 416, in other cases, such data may be written to the configuration registers at runtime of a design responsive to user-provided commands. For example, executable runtime code referred to as a "runtime" and/or scripts may be used to receive user commands (e.g., in real-time), parse the commands using the metadata and/or other user-specified runtime settings, generate configuration data for configuration registers 306 of selected tiles of DP array 102 used by the design for performing trace, and write such configuration to the respective configuration registers 306.

In block 418, the design is run on the target IC. More particularly, the design is loaded into the target IC and is executed (or started). The design is configured to perform trace functions. Accordingly, during operation, one or more tiles of the DP array 102 generate and output trace data that may be stored in a memory. In block 420, a trace report is generated from the trace data. The trace data may be provided to, or obtained by, a data processing system that executes one or more trace analysis tools. The trace analysis tools are capable of processing the trace data to generate a trace report as described herein in greater detail below.

Figure 5:
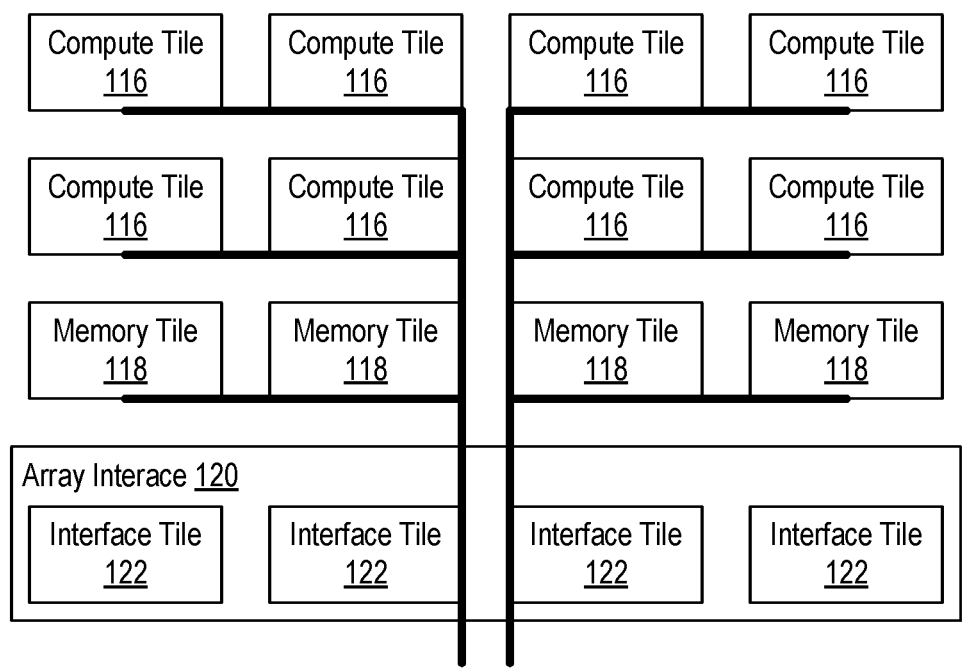
FIG. 5 illustrates an example implementation of a design for a DP array that uses a user-specified number of streams of trace data.

FIG. 5 illustrates an example implementation of a design for DP array 102 where the user has specified 2 streams of trace data as a compilation option. For purposes of illustration, each of compute tiles 116 and each of memory tiles 118 is used by the user's design. Within this disclosure, each tile that is used by a user's design is referred to as an active tile. In other cases, not all tiles may be used to implement/execute a user's design. Thus, not all tiles of DP array 102 may be active tiles.

In the example, DP array compiler 408 has connected each active tile for purposes of routing trace data to a stream. Each tile that is configured to perform trace contributes trace data to a particular stream as routed in DP array 102. Thus, the particular streams for conveying trace data as implemented in DP array 102 may be shared among multiple tiles. For example, the user specifies the number of streams desired as a compilation option. A "stream" within the DP array 102 refers to a data path or route through one or more stream switches of tiles of the DP array 102 through which data (e.g., trace data) is conveyed. DP array compiler 408 creates connections for each tile used in the user's design to a stream of trace data. If the user specifies 16 streams of trace data and there are 64 active tiles in the DP array 102, DP array compiler 408 will create the 16 streams. As an example, each stream may have 4 different tiles connected thereto that contribute trace data to the stream. Thus, streams may include trace data generated by more than one tile. Appreciably, however, the particular number of tiles on a given stream may depend on other factors such as the placement of the kernels to tiles. Thus, there is no requirement to have an even distribution of active tiles to streams.

Figure 6:
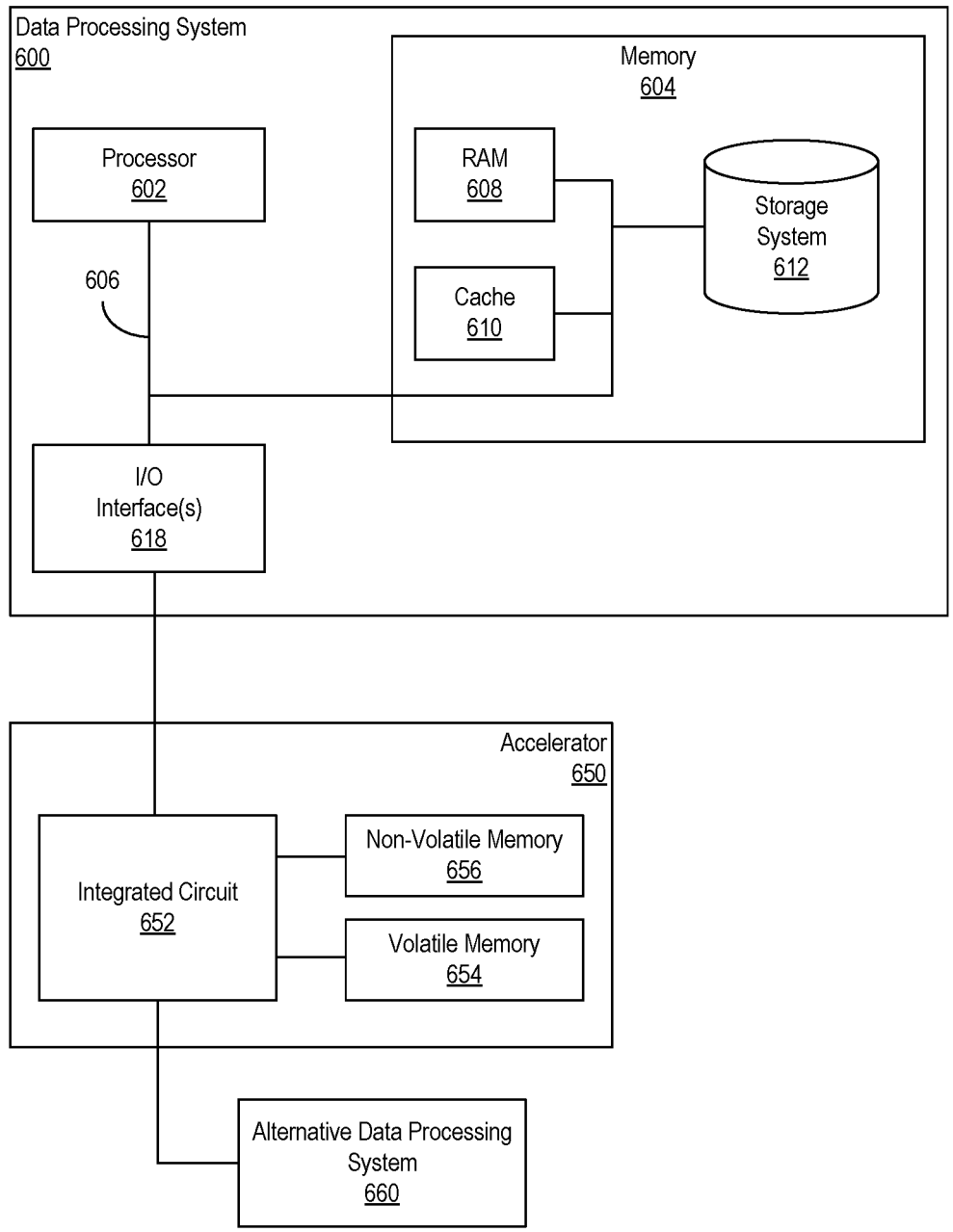
FIG. 6 illustrates an example computing environment including a data processing system and an accelerator having a target IC for use with the inventive arrangements.

FIG. 6 illustrates an example computing environment including a data processing system 600 and an accelerator 650 for use with the inventive arrangements. Data processing system 600 is an example of a computer that is capable of performing the design flow 400 of FIG. 4 and/or the trace analysis of block 420 of FIG. 4. It should be appreciated that any of a variety of data processing systems may implement data flow 400 and/or block 420. For certain operations such as those of design flow 400, accelerator 650 does not need to be coupled to the data processing system.

As defined herein, the term "data processing system" means one or more hardware systems configured to process data, each hardware system including at least one hardware processor and memory, wherein the processor is programmed with computer-readable instructions that, upon execution, initiate operations. Data processing system 600 can include a processor 602, a memory 604, and a bus 606 that couples various system components including memory 604 to processor 602.

Processor 602 may be implemented as one or more hardware circuits, e.g., integrated circuits, capable of carrying out instructions contained in program code. In an example, processor 602 is implemented as a CPU. Processor 602 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 606 represents one or more of any of a variety of communication bus structures. By way of example, and not limitation, bus 606 may be implemented as a Peripheral Component Interconnect Express (PCIe) bus. Data processing system 600 typically includes a variety of computer system readable media. Such media may include computer-readable volatile and non-volatile media and computer-readable removable and non-removable media.

Memory 604 can include computer-readable media in the form of volatile memory, such as RAM 608 and/or cache memory 610. Data processing system 600 also can include other removable/non-removable, volatile/non-volatile computer storage media. By way of example, storage system 612 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 606 by one or more data media interfaces. Memory 604 is an example of at least one computer program product.

Memory 604 is capable of storing computer-readable program instructions that are executable by processor 602. For example, the computer-readable program instructions can include an operating system, one or more application programs, other program code, and program data. Processor 602, in executing the computer-readable program instructions, is capable of performing the various operations described herein that are attributable to a computer. It should be appreciated that data items used, generated, and/or operated upon by data processing system 600 are functional data structures that impart functionality when employed by data processing system 600.

As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Data processing system 600 may include one or more Input/Output (I/O) interfaces 618 communicatively linked to bus 606. I/O interface(s) 618 allow data processing system 600 to communicate with one or more external devices such as accelerator 650. Examples of I/O interfaces 618 may include, but are not limited to, network cards, modems, network adapters, other adapters (e.g., PCIe adapters), hardware controllers, serial interfaces, etc. Examples of external devices also may include devices that allow a user to interact with data processing system 600 (e.g., a display, a keyboard, and/or a pointing device).

Data processing system 600 is only one example implementation. Data processing system 600 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

Data processing system 600 and accelerator 650 communicate over a communication link. The communication link may be a PCIe channel. Accelerator 650 may be implemented as a circuit board that couples to data processing system 600. In some examples, accelerator 650 may be inserted into a card slot, e.g., an available bus and/or PCIe slot, of data processing system 600. In some cases, accelerator 650 may be considered a peripheral device of data processing system 600.

Accelerator 650 may include an IC 652. IC 652 may be implemented using the example architecture of FIG. 1 or another similar architecture. Accelerator 650 also may include a volatile memory 654 coupled to IC 652 and a non-volatile memory 656 also coupled to IC 652. Volatile memory 654 may be implemented as a RAM. Non-volatile memory 656 may be implemented as flash memory.

In the example of FIG. 6, particular operations described herein and attributed to a runtime that executes in cooperation with the user's design as implemented in DP array 102 may be executed by a processing unit of the PS 106 within IC 652 (e.g., as opposed to in data processing system 600). In the alternative or in addition, another system such as alternative data processing system 660 may be coupled to IC 652 by way of a different physical connection such as a Joint Test Action Group (JTAG) connection, a serial connection, or an Ethernet connection. In that case, alternative data processing system 660 may communicate with IC 652 via the physical connection.

The runtime, in executing on PS 106 along with an operating system (e.g., Linux), has access to drivers that are executed locally in PS 106 in IC 652. PS 106 is directly coupled to the various subsystems of IC 652 so as to directly access (e.g., read and/or write) configuration registers 306 of DP array 102. The PS 106 may directly access configuration registers 306 of DP array 102. This provides increased security in that data processing system 600 is unable to access such configuration registers directly. The runtime, as executed by PS 106, is capable of accessing a driver to communicate directly with DP array 102. For this reason, host data processing system 600 may not perform the operations described herein as attributable to the runtime executing in PS 106.

FIG. 7 illustrates an example method 700 of performing hardware trace and analysis for a design implemented in DP array 102. In block 702, a design for DP array 102 is implemented in a target IC. The design may be implemented, at least in part, by adding a trace data offload architecture to the design. For example, a data processing system may process the user's design through design flow 400 of FIG. 4. A selected trace data offload architecture as illustrated in FIG. 9 is included or added to the user's design.

In block 704, one or more selected tiles of DP array 102 that are used by the design (e.g., active tiles) as implemented in the target IC are configured to generate trace data. The configuration of the selected tiles may be based on user-specified runtime settings for performing trace.

In one aspect, the user-specified runtime settings may be provided during compilation and included in the design as compiled (e.g., within package files 416). In another aspect, the user-specified runtime settings may be provided to the selected tiles subsequent to implementation of the user's design in the DP array, e.g., at runtime, and prior to execution of the design. In one aspect, the user-specified runtime settings may be provided to the runtime executing in PS 106 by way of a Secure Socket Shell (SSH) via Ethernet, a terminal window TTY (teletype or virtual teletype) session over a serial port, or the like. The user specified settings may be provided via a command line interface (or other user interface) that allows the user to access the PS 106 and operating system executing thereon. The runtime may generate configuration data from the user-specified runtime settings provided thereto and write the configuration data to configuration registers 306 of the selected tiles. In another aspect, the user-specified runtime settings may be processed by scripts executing in a data processing system at runtime of the user's design as implemented in the DP array and provided to the DP array prior to execution of the user's design.

In block 706, during execution of the design by the DP array, trace data as generated by the one or more selected tiles of the DP array is conveyed to a memory of the target IC using, at least in part, the trace data offload architecture. In block 708, a data processing system coupled to the target IC generates a trace report from the trace data. In general, the trace report provides and/or visualizes details of the trace data (e.g., trace events) including function calls/returns, various types of stalls, DMA circuit activity, and/or interface activity on a per tile basis.

FIG. 8 illustrates an example implementation of block 702 of FIG. 7. In block 802, the data processing system receives one or more user-specified compilation options for performing trace. For example, the compilation options may indicate the particular trace data offload architecture to be used and the number of streams of trace data to be output from the DP array. In the case where the trace data offload architecture is implemented in PL using the PLIO option, the user-specified options may specify a bit-width of the data paths used to convey the streams of trace data through the PL.

In block 804, the data processing system compiles the design by placing and routing kernels and, with respect to the DP array, generating executable program code from the kernels as placed and routed. In one aspect, as part of compilation, the data processing system is capable of routing a specified number of streams for conveying the trace data from each tile of the DP array that is used by the design as implemented in the DP array (e.g., each active tile).

In block 806, the data processing system implements the particular trace data offload architecture specified by the user. The trace data offload architecture, as noted, may be added during the linking phase of design flow 400.

If, for example, the user specified a PL implementation, the data processing system performs block 808 and implements one or more data paths within the PL of the target IC and connects the data path(s) to the DP array and one or more other circuits external to the DP array. In one or more example implementations, the data processing system may implement the PL based trace data offload architecture by including one or more Intellectual Property (IP) cores into the user's design as block diagrams and connecting the IP cores to the design. The IP cores implementing the data path(s) may be coupled to particular PL interfaces 220 in particular interface tiles 122 to which the streams of trace data are routed.

If the user specified a DMA implementation, the data processing system performs block 810. In block 810, the data processing system generate data to configure the DMA circuits for conveying stream(s) of trace data in the particular interface tiles 122 to which the streams of trace data are routed. In one aspect, each DMA circuit may convey a single stream of trace data. In other examples, each DMA circuit may convey two or more streams of trace data (e.g., over separate channels). Appreciably, the data processing system performs either block 808 or block 810 based on the compilation option that specifies the user selected trace data offload architecture. In any case, in block 810, the data processing system implements data path(s) from the DMA circuits of the interface tiles to other circuit(s) external to the DP array. In general, regardless of whether block 808 or 810 is performed, the data processing system is capable of implementing one data path for each stream of the trace data to be output from the DP array. Each data path will include one data mover.

In block 812, the data processing system generates metadata. In general, the metadata specifies correlations between different portions of the user's design and different tiles of the DP array used to implement that design. For example, the metadata may specify which tiles of the DP array are active (e.g., used by the design) and what graphs and/or kernels are assigned to each active tile. The term "graph," as used in the context of DP array 102, refers to an application that may execute independently of other graphs (applications) implemented in the DP array 102. That is, several different graphs or processing pipelines of tiles may be implemented that operate independently and/or concurrently. The metadata may also specify the type, amount, and location of the IP cores that were inserted in creating the trace data offload architecture. By generating metadata that may be provided to other systems and/or software, such other software allows the user to configure and control the trace performed in the DP array.

In block 814, the data processing system generates the package files. As noted, the package files include the binaries/image files that may be loaded into the target IC. The package files also may include the generated metadata. As noted, the metadata may be provided to one or more other systems executing suitable program code for controlling trace in the DP array.

Figure 9A:
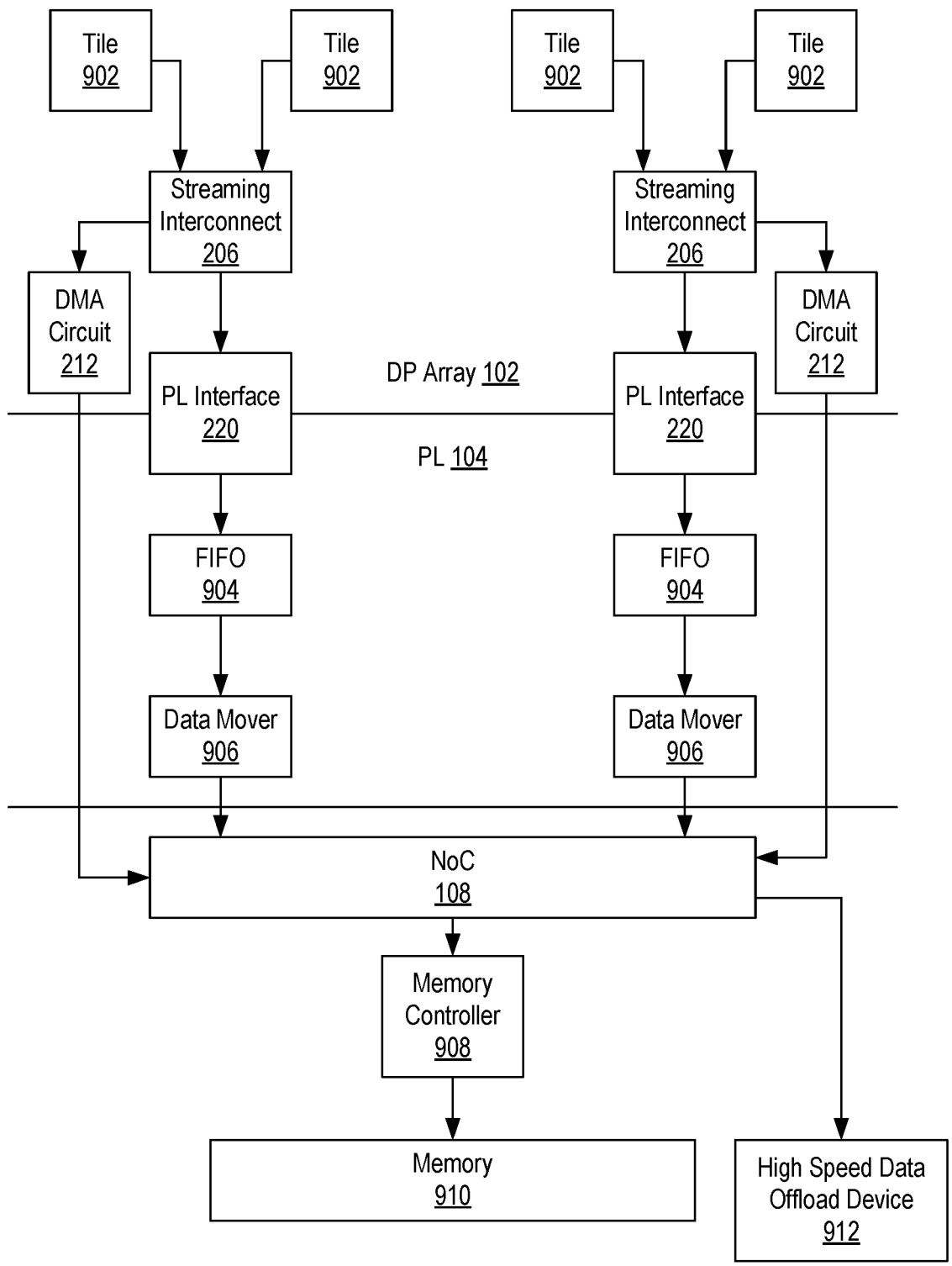
FIGS. 9A, 9B, and 9C illustrate examples of trace data offload architectures that may be implemented to convey trace data from a DP array.
Figure 9B:
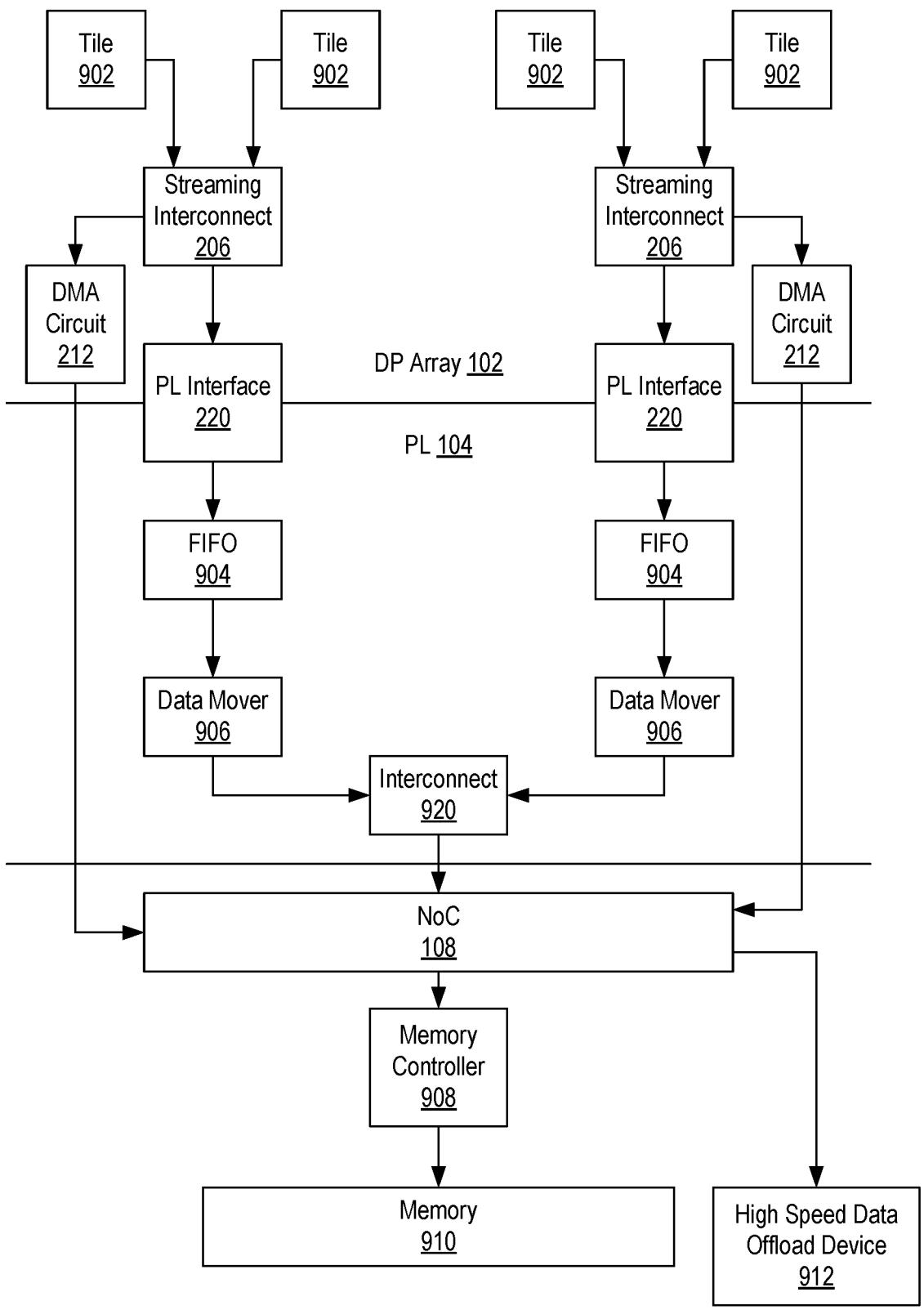
Figure 9C:
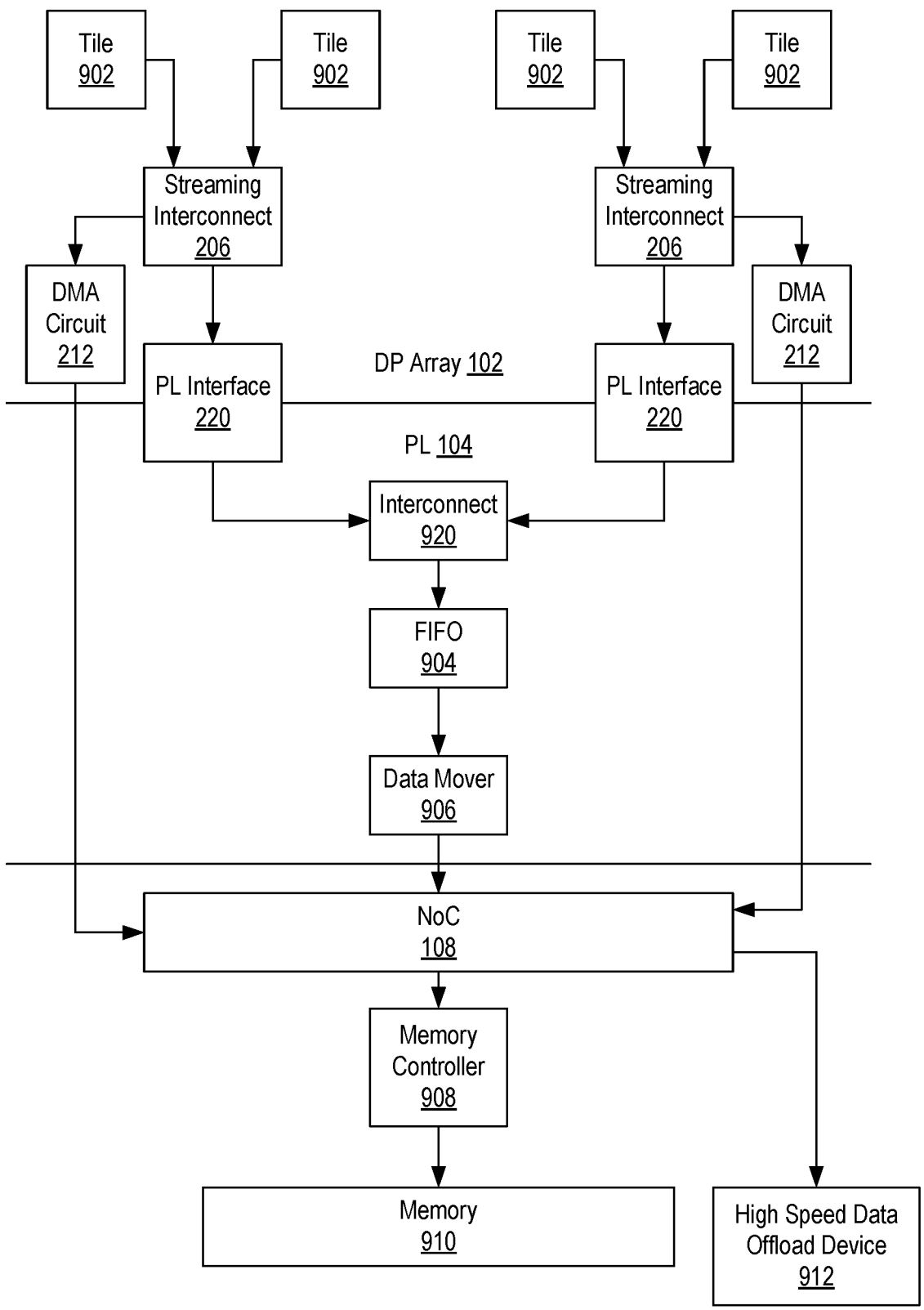

FIGS. 9A, 9B, and 9C illustrate examples of the trace data offload architectures that may be implemented to convey trace data from the DP array. In the example of FIG. 9A, tiles 902 may represent compute tiles 116, memory tiles 118, interface tiles 122, or any combination thereof. For purposes of illustration, the user has selected, by way of compilation options, to implement two streams of trace data. In the example, each tile 902 outputs a single stream of trace data. In other examples, tiles 902 may be implemented to output two or more streams of trace data. The data output from the tiles 902 is not considered equivalent to the streams (e.g., number of streams) specified by the user. Streaming interconnects 206, for example, combine the streams received from different ones of tiles 902 based on the routing to form the particular number of user-specified streams that are output from DP array 102, which is 2 in this case.

The examples of FIGS. 9A, 9B, and 9C illustrate the two different types of trace data offload circuitry being implemented. For purposes of illustration, both are illustrated as being implemented concurrently. It should be appreciated, however, that only one of the two types illustrated would be implemented for a given user design.

Referring to FIG. 9A, as illustrated, trace data from active tiles 902 of DP array 102 are routed to provide trace data to respective streaming interconnects 206 disposed in one or more of the tiles of DP array 102. In the case where the user has selected the DMA-based option, the trace data is routed to DMA circuits 212. DMA circuits 212 may be directly coupled to NoC 108 to provide trace data thereto. In the example, each DMA circuit 212 provides one stream of trace data. Though the connections from DMA circuits 212 to NoC 108 are shown as traversing through PL 104, it should be appreciated that DMA circuits 212 may be directly coupled to NoC 108 so as not to utilize or require any circuit resources of PL 104 to establish the connections illustrated.

In the case where the user has selected the PL-based option, the trace data is routed to and through PL 104. In the example, each data path includes a FIFO 904 coupled to a data mover 906. Each data mover 906 couples to NoC 108. Each FIFO 904 couples to a PL interface 220 of an interface tile 122. The FIFOs 904 and the data movers 906 are inserted into the design as discussed during the linking phase. In one aspect, the depth of each FIFO 904 may be specified by the user as compilation parameters.

In the example of FIG. 9, both the PL-based option and the DMA-based option utilize data movers that are configured to convert streaming data to memory-mapped data. The data movers (e.g., 906 and 212) connect to each stream of trace data (e.g., an Advanced Microcontroller Bus Architecture (AMBA) extensible Interface (AXI) stream), convert the stream to memory-mapped data, and may function as master circuits that write the trace to memory 910 via NoC 108. The data movers may write the data at high data rates. As part of the linking process of design flow 400, linker 410 defines the Quality-of-Service (QOS) values for routing the trace data through pathways of NoC 108 based on bandwidth estimates for the trace data that is expected to be generated. The estimates may be initially performed by DP array compiler 408 compiler and delivered to linker 410. The QoS values may be refined by linker 410 to ensure that system-level limits and specifications for the user's design also are met.

Trace data may be offloaded from NoC 108 to a high-speed data offload device 912 that is external to the target IC and includes circuitry capable of providing the bandwidth necessary to store the trace data. Trace data also may be offloaded to a memory 910 from NoC 108 by way of memory controller 908. Memory controller 908 is an example of an HCB 112. Memory 910 may be a DDR memory and may be implemented as volatile memory 654 of FIG. 6 (e.g., an external memory). In one or more other examples, memory 910 may be implemented as an internal memory (e.g., an HCB 112).

In one aspect, as part of the design flow, trace buffers within memory 910 may be allocated to each data mover. The depth of the buffers may be specified by the user as a single value that is divided equally amongst the data movers. In the alternative, the user may specify the depth of each buffer individually. In still another example implementation, the depth of the buffers may be automatically adjusted by runtime program code that controls trace (described herein-below in greater detail). In that case, the runtime program code may determine the depths and/or adjust the depths based on the amount of trace data being output or stored in memory 910 (e.g., by communicating with the data movers and/or memory controller 908).

Whether trace data is written to memory 910 or to high-speed data offload device 912, the trace data may be obtained by a host system (e.g., a computer) and analyzed to generate a trace report.

In the example of FIG. 9A, memory controller 908 is illustrated as the merge point where the various streams of trace data are merged together as data traffic written to memory 910. In the example of FIG. 9A, each stream of trace data requires its own entry point to NoC 108, e.g., its own NoC master circuit to place the data onto NoC 108.

In another example implementation, the merge point and/or points may be adjusted by including further interconnect circuitry. FIGS. 9B and 9C illustrate alternative implementations for the PLIO implementation option. The example of FIG. 9B incorporates an interconnect 920 as a merge point after data movers 906. As shown, each data mover 906 outputs data to interconnect 920. Interconnect 920 is connected to NoC 108. In this example, only one entry point to NoC 108 is needed as the two traces are merged prior to entry into NoC 108.

In the example of FIG. 9C, the merge point implemented by interconnect 920 is moved prior to FIFOs 904. As shown, each PL interface 220 connects to interconnect 920. From interconnect 920, a single FIFO 904 is used along with a single data mover 906 that connects to NoC 108 through a single entry point. In each of FIGS. 9B and 9C, the number of entry points into NoC 108 is reduced for a given number of streams of trace data. The NoC master circuits are hardened circuit blocks available in limited numbers. In the case where streams are merged, the number of buffers needed may not coincide with the number of data movers used.

Figure 10:
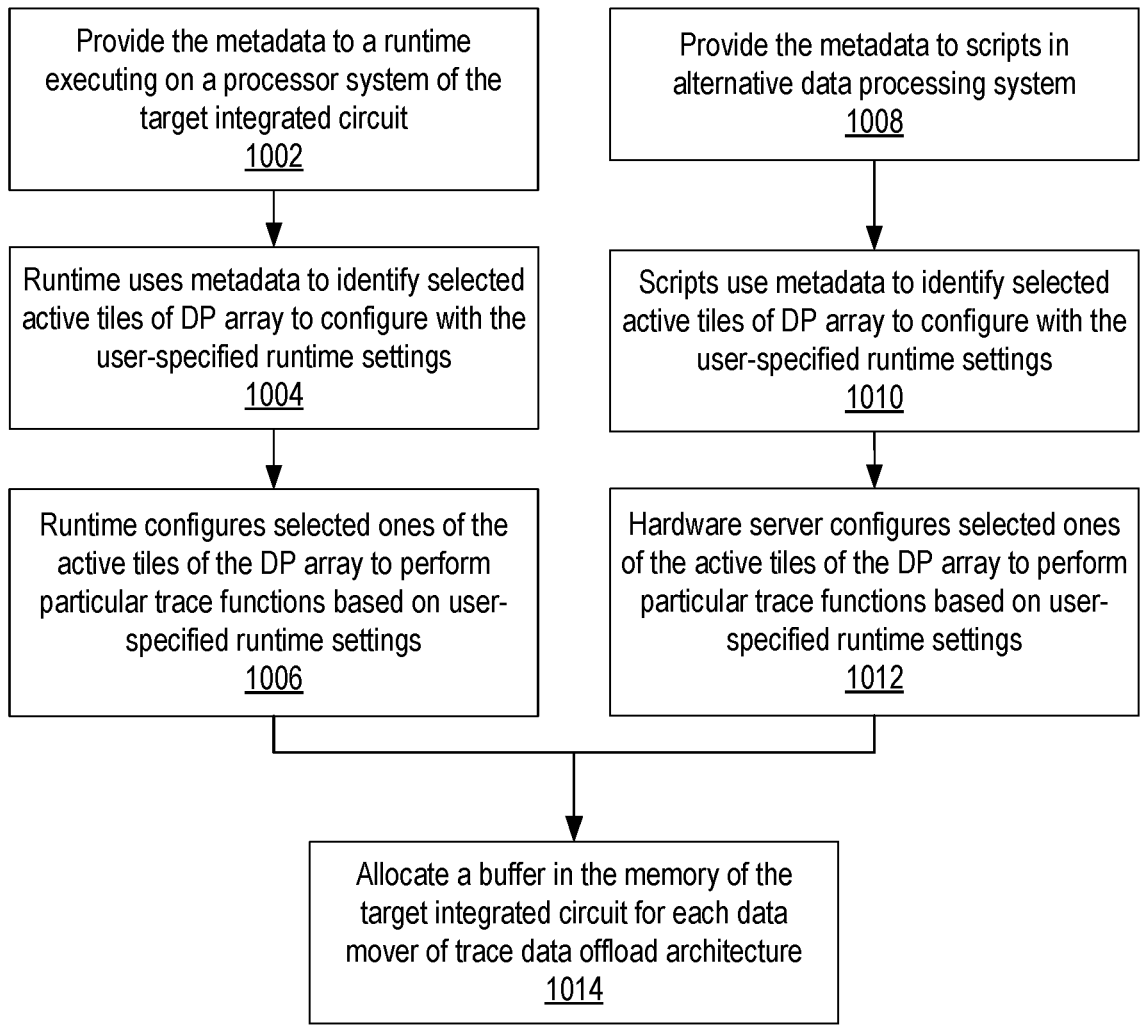
FIG. 10 illustrates an example implementation of block 704 of FIG. 7.

FIG. 10 illustrates an example implementation of block 704 of FIG. 7. The example of FIG. 10 illustrates two alternative implementations of block 704. In one example, method 700 follows blocks 1002, 1004, and 1006 to block 1014. This implementation corresponds to the case in which the runtime is executing in a processing unit of PS 106. The runtime may execute concurrently with the user's design in DP array 102. The runtime is capable of controlling operation of the user's design in DP array 102 as well as the trace functionality (e.g., start and stop of trace functionality, configuration of trace functionality, depth of buffers, etc.).

In block 1002, the metadata generated during design flow 400 is provided to the runtime executing on PS 106 of the target IC. In block 1004, the runtime uses the metadata to identify selected ones of the active tiles of the DP array to configure based on the user-specified runtime settings. As noted, the metadata specifies correlations between different portions of the design and different tiles of the data processing array used by the design. The user-specified runtime settings define how and/or when trace is to be performed. For example, the runtime settings may specify starting conditions for trace, stopping conditions for trace, the particular active tiles of the DP array that are to be generating trace data, the particular events that are to be detected in each respective active tile that is enabled for trace, and counter initialization and configuration settings.

In block 1006, the runtime configures selected ones of the active tiles of the DP array to perform particular trace functions based on the user-specified runtime settings. For example, the runtime is capable of writing to the configuration registers 306 of the respective ones of the active tiles to configure trace functionality. In performing block 1006, it should be appreciated that a set of user-specified runtime settings may be specified as part of the user's design that is loaded into DP array 102. In other examples, the user may provide the user-specified runtime settings to the runtime executing in the target IC at runtime of the user's design in the DP array. In that case, the runtime parses the received user-specified runtime settings to generate the configuration data used to configure the selected ones of the active tiles for performing trace.

In another example, method 700 follows blocks 1008, 1010, and 1012 to block 1014. This implementation corresponds to the case in which a computer system (e.g., alternative data processing system 660) is coupled to accelerator 650 via a physical connection such as JTAG, a serial connection, Ethernet, etc. In this example, accelerator 650 is not a peripheral device of data processing system 660 in that accelerator 650 is not connected by way of a bus of the data processing system. Alternative data processing system 660 may execute software referred to as a "hardware server" that allows alternative data processing system 660 to interact with IC 652 and provides access to configuration registers of IC 652. In this example, alternative data processing system 660 is executing one or more scripts that are capable of performing functions attributed to the runtime in terms of generating configuration data for the DP array. Execution of the hardware server allows alternative data processing system 660 to configure tiles of the DP array using the configuration data generated by the scripts.

In block 1008, the metadata generated during the design flow is provided to the scripts executing on alternative data processing system 660. In block 1010, the scripts use the metadata to identify selected ones of the active tiles of the DP array to configure based on the user-specified runtime settings. In block 1012, the scripts provide configuration data to the target IC by way of the hardware server. The scripts, operating through the hardware server, are capable of writing to the configuration registers 306 of the respective ones of the active tiles to configure trace functionality.

For purposes of illustration, consider the following case scenario. The scripts are capable of parsing a received user command. Listing 2 shows an example of a command line command that provides user-specified runtime settings.

Listing 2
aietrace start -link-summary foo.summary -base-address 0x900000000 -depth 0x1000000 -work-dir Work -graphs mygraph -config-level functions_all_stalls In the example of Listing 2, the user command provides user-specified runtime settings such as a base address for creating the buffers in memory, the particular graphs (e.g., combinations of kernel) to be traced, and the particular events to be detected (e.g., stalls). The scripts parse the command and initialize the relevant or selected active tiles by cross referencing the noted graphs and/or functions with the metadata to determine which active tiles are to be configured. The scripts may perform operations such as writing configuration data specifying the trace events to be detected to the configuration registers 306, writing to counters 308, and establishing or configuring the buffers in memory. The scripts wait until the user's design completes execution. In response to the design completing execution, a trace stop function of the scripts may be executed. The scripts are capable of reading the buffers from memory and writing the trace data to memory of alternative data processing system 660 as files to be analyzed for performing the trace analysis.

It should be appreciated that the particular operations described as being performed by the scripts executing in the alternative data processing system 660 may also be performed by the runtime as executed in the PS 106 of the target IC at runtime of the user's design in the DP array. The runtime may perform similar functionality in that the runtime may parse received user commands, configure the DP array as described, allocate buffers, and move the trace data from the buffers into files stored in the host system memory (e.g., memory 604).

In block 1014, buffers are allocated in memory (e.g., memory 910). The buffers may be allocated by the runtime or the scripts depending on the particular implementation of trace being performed. In general, one buffer may be allocated for each different data mover of the trace data offload architecture. As discussed, buffer depth may be user-specified or handled automatically by the runtime. In another aspect, buffers may be allocated so that one buffer is allocated per data mover. In another example, buffers may be allocated so that one buffer is allocated per data stream.

As illustrated, the user may interact with the runtime executing in the PS 106 or the scripts executing in the alternative data processing system 660 to provide updated user-specified runtime settings. This allows a user to reconfigure trace functionality for the user's design in the DP array in real time. Aspects of trace that may be changed include, but are not limited to, which active tiles are configured to generate trace data in executing the user's design, which trace events are detected, and/or the start and/or stop conditions for performing trace, and/or the size of buffers allocated in memory 910.

The runtime and/or scripts are capable of starting and stopping the trace functionality based on the user-specified settings in performing block 706 of FIG. 7.

Figure 11:
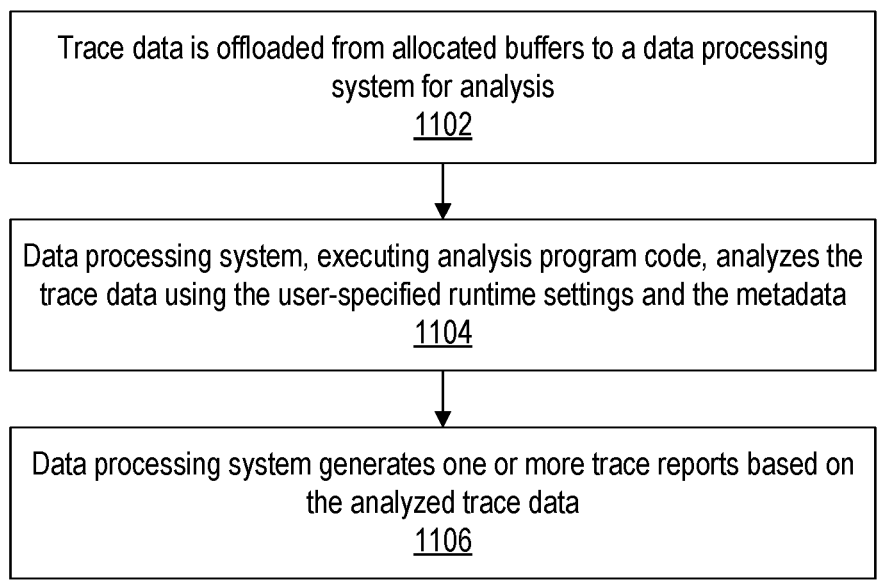
FIG. 11 illustrates an example implementation of block 708 of FIG. 7.

FIG. 11 illustrates an example implementation of block 708 of FIG. 7. In block 1102, trace data from the buffers allocated in memory 910 is offloaded to a data processing system (e.g., 600, 660) for analysis. In one aspect, the runtime executing in PS 106 is capable of conveying the data from memory 910 to memory 604 of data processing system 600. Alternatively, scripts executing in alternative data processing system 660 may obtain the trace data and store the trace data locally in memory. In one aspect, one file of trace data may be created for each buffers of the trace data.

In block 1104, the data processing system is capable of analyzing the trace data as offloaded using the metadata and/or the user-specified runtime settings. The data processing system may execute trace analysis program code implementing the various analysis and trace report generation operations described herein. The data processing system may also store a trace packet format library specifying the formatting of the trace packets of the trace data so that the data processing system may parse, interpret, and/or analyze the trace data.

In one or more examples, the trace data may be in a compressed format. As part of the analysis, the data processing system is capable of decompressing the trace data. The raw (e.g., unprocessed) trace data may be in a hexadecimal format. The analysis provides context to the trace data. For example, context from the metadata and/or user-specified runtime settings may be used to contextualize the various trace events of the trace data.

For purposes of illustration and not limitation, the data processing system may correlate the occurrence of a trace event such as a stall or a counter value for a particular tile with the program code executing on that tile and with the particular function call and/or operation executing when the trace event (e.g., a stall in this example) occurred. In this example, the trace data may indicate the tile of the DP array in which a trace event occurred, the time of the occurrence, and the particular type of trace event that occurred. The data processing system cross-references the trace data with the metadata and/or user-specified runtime settings to add/determine contextual data such as the particular program code (e.g., kernel), function, and/or operation being performed at the time of the trace event. That is, the data processing system may determine that tile A executing function B of kernel C was performing operation D at the time of the detected trace event E. The operation may be the transfer of a particular buffer. The path of that buffer as conveyed through multiple tiles (e.g., stream interconnects and/or DMA circuits) may be traced via trace events generated by the various tiles in the path.

In block 1106, the data processing system is capable of generating one or more trace reports based on the analyzed traced data. The trace report(s) correlate the trace events with a particular operating context of the one or more selected tiles of the data processing array as specified by the metadata. For example, the trace report(s) can correlate trace events of the trace data with respective tiles of the one or more selected tiles (e.g., active tiles) of the DP array.

Figure 12A:
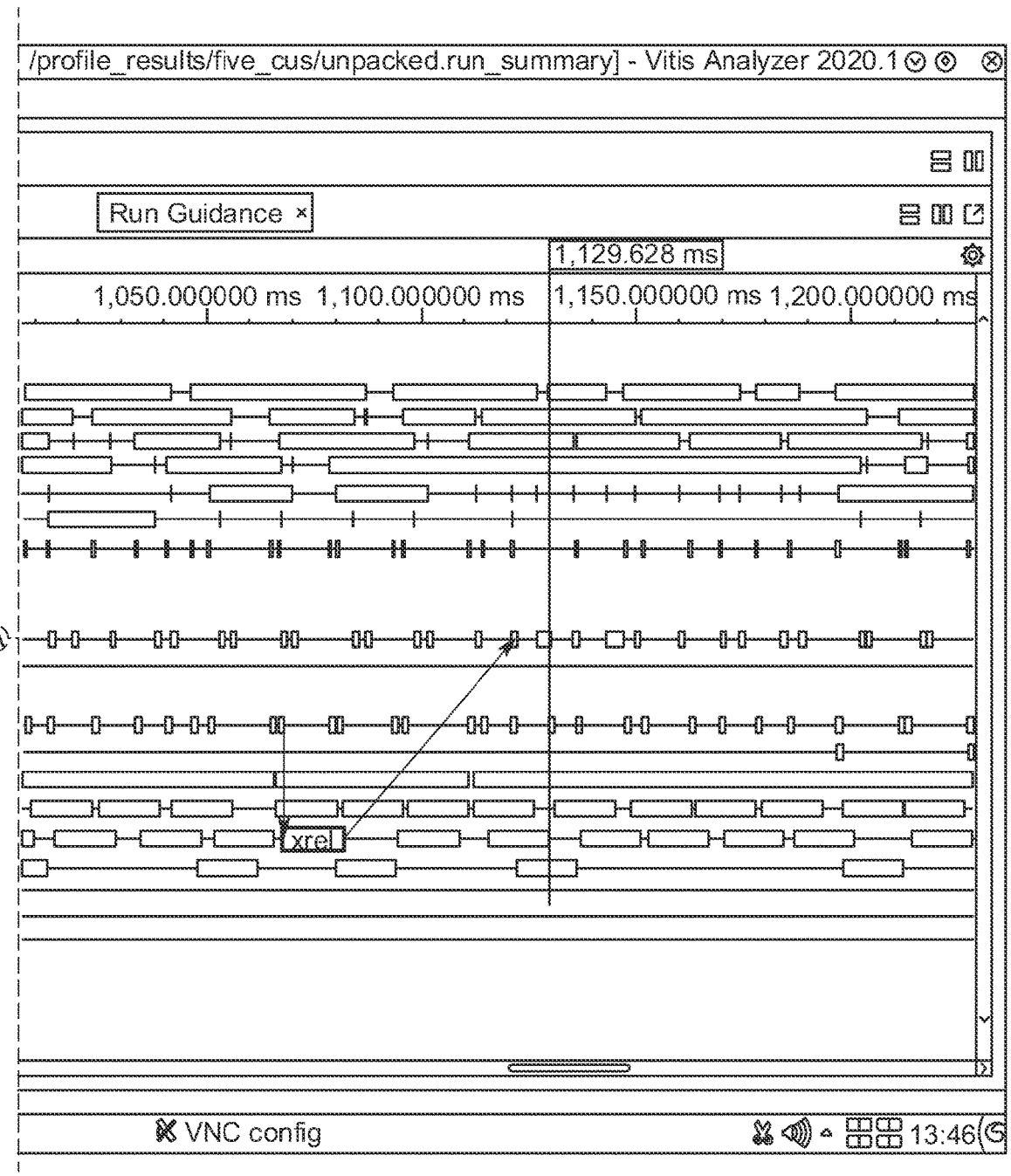
FIGS. 12A and 12B illustrate example trace reports that may be generated by the data processing system.
Figure 12B:
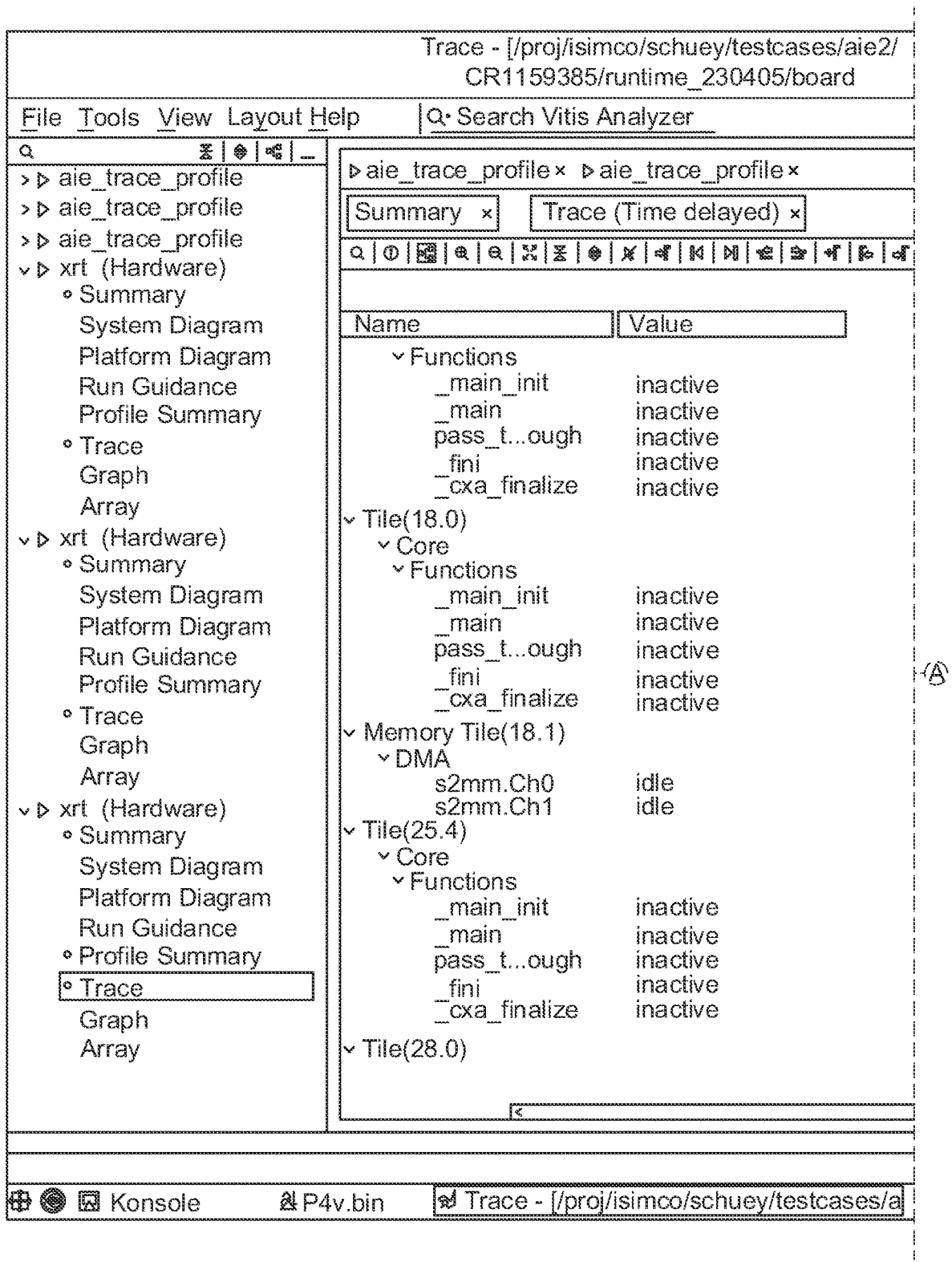
Figure 12B:
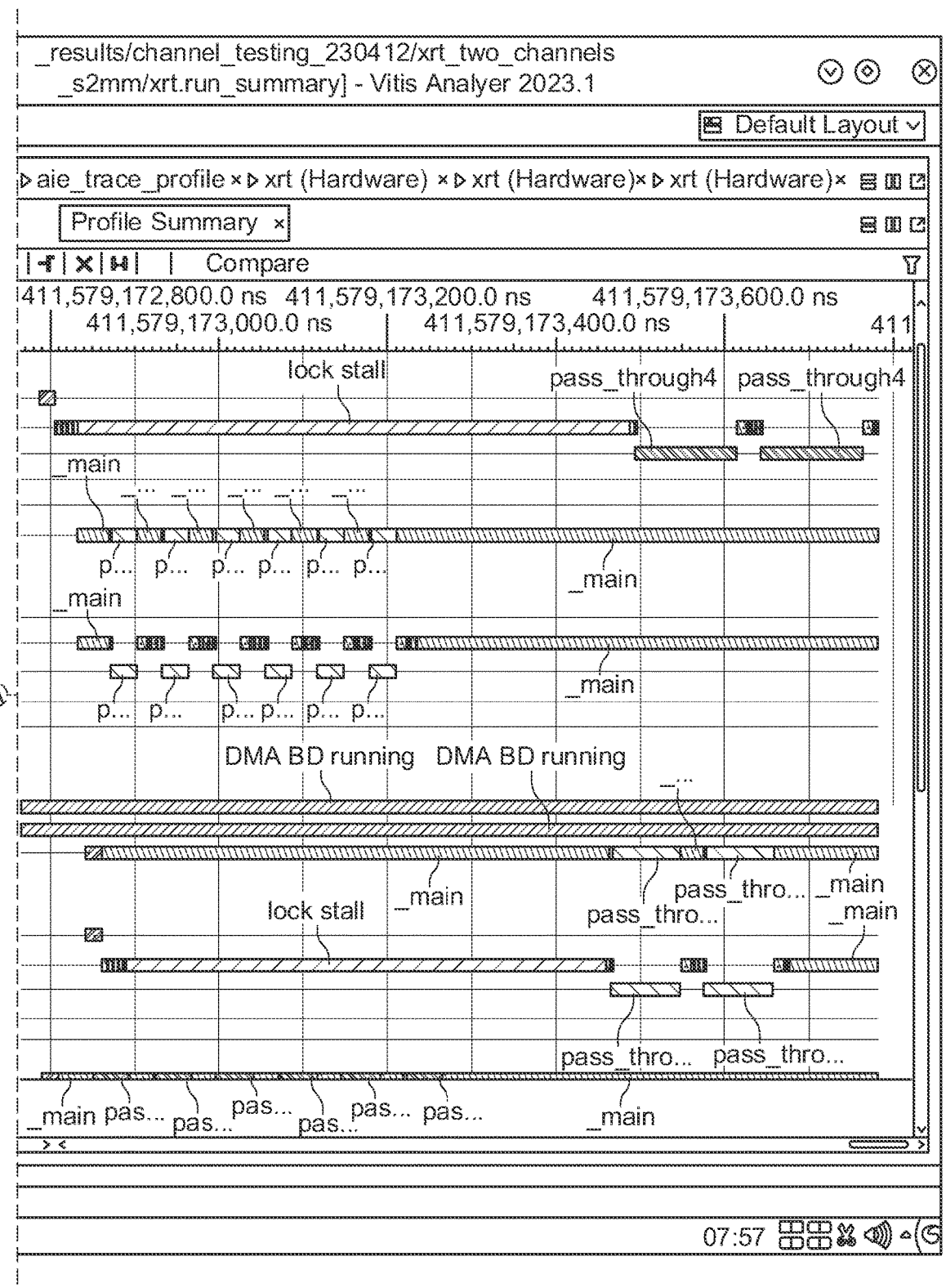

FIGS. 12A and 12B illustrate example reports that may be generated by the data processing system. In the example of FIG. 12A, the report provides trace-based guidance that details operations occurring in PS 106. In the example of FIG. 12A, the report detects and highlights dependencies between trace events where one trace event does not occur until after another trace event is done. Other operations potentially may occur therebetween. The time between the trace events (e.g., the amount of delay) indicates the need for a potential design modification or optimization.

In the example of FIG. 12B, the report provides a visualization of activity occurring in the DP array in executing the user's design. The example of FIG. 12B illustrates trace vents for memory tiles of a DP array 102 in executing a user design.

In both FIGS. 12A and 12B, the trace events (e.g., trace data) is illustrated as the blocks placed along the timeline in different rows while the particular meaning of the rows as specified by the information of the tree hierarchy on the left of each trace report is obtained from the metadata (e.g., tiles, graphs, kernels, functions, etc.). The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of examples of computer-readable storage media include an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, "data processing system" means one or more hardware systems configured to process data, each hardware system including at least one hardware processor programmed to initiate operations and memory.

As defined herein, "execute" and "run" comprise a series of actions or events performed by the hardware processor in accordance with one or more machine-readable instructions. "Running" and "executing," as defined herein refer to the active performing of actions or events by the hardware processor. The terms run, running, execute, and executing are used synonymously herein.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "individual" and "user" each refer to a human being.

As defined herein, the term "hardware processor" means at least one hardware circuit. The hardware circuit may be configured to carry out instructions contained in program code. The hardware circuit may be an integrated circuit. Examples of a hardware processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "real-time" means a level of processing responsiveness that a user or system senses as sufficiently immediate for a particular process or determination to be made, or that enables the processor to keep up with some external process.

As defined herein, the term "soft" in reference to a circuit means that the circuit is implemented in programmable logic or programmable circuitry. Thus, a "soft processor" means at least one circuit implemented in programmable circuitry that is capable of carrying out instructions embodied as program instructions.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc., may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the term "program code" is used interchangeably with the term "program instructions." Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    implementing a design for a data processing array of a target integrated circuit by, at least in part, adding a trace data offload architecture to the design;
    configuring one or more selected tiles of the data processing array used by the design as implemented in the target integrated circuit to generate trace data based on user-specified runtime settings for performing a trace;
    during execution of the design by the data processing array, conveying the trace data as generated by the one or more selected tiles of the data processing array to a memory of the target integrated circuit using the trace data offload architecture; and
    generating a trace report from the trace data using a data processing system coupled to the target integrated circuit, wherein the generating the trace report comprises analyzing the trace data using the user-specified runtime settings and metadata generated from compiling the design, wherein the trace report correlates trace events of the trace data with respective tiles of the one or more selected tiles of the data processing array.

2. The method of claim 1, further comprising:
    generating the metadata from compiling the design, wherein the metadata specifies correlations between different portions of the design and different tiles of the data processing array used by the design; and
    providing the metadata to a runtime executing on a processor system of the target integrated circuit, wherein the runtime performs the configuring of the one or more selected tiles of the data processing system.

3. The method of claim 1, further comprising:
    generating the metadata from the compiling, wherein the metadata specifies correlations between different portions of the design and different tiles of the data processing array used by the design;
    generating configuration data used to configure the one or more selected tiles of the data processing array based on the metadata; and
    providing the configuration data to the data processing array.

4. The method of claim 1, wherein the trace data offload architecture is capable of
    conveying one or more streams of the trace data from the data processing array through one or more data paths implemented in programmable logic.

5. The method of claim 1, wherein the implementing further comprises:
    routing a specified number of streams for conveying the trace data to the trace data offload architecture, wherein each tile of the data processing array used by the design is coupled to at least one of the streams.

6. The method of claim 5, further comprising:
    coupling the streams conveying trace data to one or more data movers of the trace data offload architecture.

7. The method of claim 5, further comprising:
    allocating buffers in the memory of the target integrated circuit for the streams.

8. The method of claim 7, wherein each buffer as allocated has a user-specified depth.

9. The method of claim 1, wherein the trace data offload architecture is capable of
    conveying one or more streams of the trace data from the data processing array through one or more direct memory access circuits.

10. The method of claim 1, wherein the trace report correlates the trace events with particular functions executed by the one or more selected tiles of the data processing array as specified by the metadata.

11. The method of claim 1, wherein the trace report correlates the trace events with a particular operation performed by a function executed by the one or more selected tiles of the data processing array as specified by the metadata.

12. The method of claim 1, wherein the user-specified runtime settings specify the trace events generated during the trace.

13. A system, comprising:
an integrated circuit having:
a data processing array including an array of tiles having a plurality of hardwired compute tiles each including a processor and a data memory, wherein the processor and the data memory of each compute tile comprises event logic and trace circuitry configured to generate trace events each associated with at least one of a timer value or a program counter value for the compute tile;
a user-specified trace data offload architecture coupled to the data processing array; and
a memory;
wherein a plurality of active tiles of the array of tiles are used to execute a user design implemented in the data processing array;
wherein one or more selected tiles of the plurality of active tiles are configured to generate trace data including the trace events during execution of the user design by the data processing array; and
wherein the user-specified trace data offload architecture is configured to convey a plurality of streams of the trace data as generated by the one or more selected tiles to the memory.

14. The system of claim 13, wherein the user-specified trace data offload architecture comprises:
one or more data paths implemented in programmable logic for the plurality of streams of the trace data.

15. The system of claim 13, wherein the user-specified trace data offload architecture comprises:
one or more direct memory access circuits configured to convey the plurality of streams of the trace data.

16. The system of claim 13, further comprising:
a data processing system configured to generate a trace report from the trace data.

17. The system of claim 16, wherein the data processing system is configured to generate the trace report by analyzing the trace data using user-specified runtime settings and metadata generated from compiling the user design to correlate trace events of the plurality of streams of the trace data with respective tiles of the one or more selected tiles.

18. The system of claim 17, wherein the data processing system is configured to generate the trace report by correlating the trace events with particular functions executed by the selected tiles as specified by the metadata.

19. The system of claim 17, wherein the data processing system is configured to generate the trace report by correlating the trace events with particular operations performed by particular functions executed by the selected tiles as specified by the metadata.

20. The system of claim 13, wherein the integrated circuit comprises:
a network-on-chip, wherein the user-specified trace data offload architecture conveys the plurality of streams of the trace data from the data processing array to the network-on-chip; and
a memory controller coupled to the network-on-chip, wherein the memory controller is configured to write the trace data received via the network-on-chip to the memory.

* * * * *